(12) United States Patent
Cohen et al.

(10) Patent No.: US 11,106,749 B2
(45) Date of Patent: Aug. 31, 2021

(54) FEDERATING MOTE-ASSOCIATED INDEX DATA

(71) Applicant: JTT INVESTMENT PARTNERS, LLC, Atlanta, GA (US)

(72) Inventors: Alexander J. Cohen, Mill Valley, CA (US); Edward K. Y. Jung, Bellevue, WA (US)

(73) Assignee: JTT INVESTMENT PARTNERS, LLC, Atlanta, GA (US)

( * ) Notice: Subject to any disclaimer, the term of this patent is extended or adjusted under 35 U.S.C. 154(b) by 0 days.

(21) Appl. No.: 16/553,615

(22) Filed: Aug. 28, 2019

(65) Prior Publication Data

US 2019/0392013 A1 Dec. 26, 2019

Related U.S. Application Data

(63) Continuation of application No. 16/110,288, filed on Aug. 23, 2018, now abandoned, which is a continuation of application No. 15/705,688, filed on Sep. 15, 2017, now abandoned, which is a continuation of application No. 14/796,376, filed on Jul. 10, 2015, now abandoned, which is a continuation of application No. 14/744,863, filed on Jun. 19, 2015, now abandoned, and a continuation of application No. 10/816,364, filed on Mar. 31, 2004, now abandoned, and a continuation of application No. 10/816,375, filed on Mar. 31, 2004, now Pat. No. 8,200,744, and a continuation of application No. 10/816,082, filed on Mar. 31, 2004, now abandoned, and a continuation of application No. 10/816,358, filed on Mar. 31, 2004, now Pat. No. 8,161,097, and (Continued)

(51) Int. Cl.
*G06F 15/16* (2006.01)
*G06F 16/9537* (2019.01)
*H04W 64/00* (2009.01)
*G06F 9/48* (2006.01)

(52) U.S. Cl.
CPC ........ *G06F 16/9537* (2019.01); *G06F 9/4881* (2013.01); *H04W 64/00* (2013.01)

(58) Field of Classification Search
CPC ..... H04W 84/18; H04W 40/02; H04W 64/00; H04L 41/0893; H04L 67/12; H04L 41/024; G06F 17/40; G06F 16/9537; G06F 9/4881
See application file for complete search history.

(56) References Cited

U.S. PATENT DOCUMENTS 7,165,109 B2 * 1/2007 Chiloyan ............... G06F 9/4415
709/217
2002/0145978 A1 * 10/2002 Batsell ..................... H04L 45/26
370/238

(Continued)

OTHER PUBLICATIONS

Madden, S., et al. "The Design of an Acquisional Query Processor For Sensor Networks", SIGMOD 2003, Jun. 9-12, 12 pages (Year: 2003).*

Primary Examiner — Oleg Survillo
(74) Attorney, Agent, or Firm — Fish & Richardson P.C.

(57) ABSTRACT

Methods and/or systems relating to mote networks having one or more indexes. A sensing function or a control function is determined at a mote in the network. In response, one or more sensing, control, and routing/spatial indexes are created. A federated index is created for different sets of motes.

19 Claims, 11 Drawing Sheets

Related U.S. Application Data a continuation of application No. 10/816,102, filed on Mar. 31, 2004, now Pat. No. 8,335,814, and a continuation of application No. 10/813,967, filed on Mar. 31, 2004, now Pat. No. 7,366,544, and a continuation of application No. 10/814,454, filed on Mar. 31, 2004, now Pat. No. 7,317,898.

(56) References Cited

U.S. PATENT DOCUMENTS

| | | | |
|---|---|---|---|
| 2002/0161751 A1* | 10/2002 | Mulgund | H04L 41/024 |
| 2005/0021724 A1* | 1/2005 | Kung | H04W 84/18 |
| | | | 709/223 |
| 2005/0188103 A1* | 8/2005 | Chen | H04L 45/04 |
| | | | 709/238 |

* cited by examiner

| Federated Mote Index for First-Administered Set of Motes and Second-Administered Set of Motes ||||||||
|---|---|---|---|---|---|---|---|
| AGGREGATION OF CONTENT INDEXES FOR MOTE ADDRESSES 1A AND 2A OF FIRST-ADMINISTERED SET OF MOTES |||| AGGREGATION OF CONTENT INDEXES FOR MOTE ADDRESSES 3A AND 4A OF SECOND-ADMINISTERED SET OF MOTES ||||
| MOTE 1A OF FIRST-ADMINISTERED SET OF MOTES: SENSING INDEX |||| MOTE 3A OF SECOND-ADMINISTERED SET OF MOTES: SENSING INDEX ||||
| Light Device | Light Device Information Available | Query Command Format | Output Format | Pressure Device | Pressure Device Information Available | Query Command Format | Output Format |
| Electrical/ Magnetic Device | Electrical/ Magnetic Device Information Available | Query Command Format | Output Format | Temp. Device | Temp. Device Information Available | Query Command Format | Output Format |
| Inertial Device | Inertial Device Information Available | Query Command Format | Output Format | Volume Device | Volume Device Information Available | Query Command Format | Output Format |
| Antenna | Antenna Information Available | Query Command Format | Output Format | Antenna | Antenna Information Available | Query Command Format | Output Format |
| MOTE 2A OF FIRST-ADMINISTERED SET OF MOTES: CONTROL INDEX |||| MOTE 4A OF SECOND-ADMINISTERED SET OF MOTES: CONTROL INDEX ||||
| Light Sensor | Light Device Commands Available | Control Command Format | Feedback Format | Pressure Device | Pressure Device Commands Available | Control Command Format | Feedback Format |
| Electrical/ Magnetic Device | Electrical/ Magnetic Device Commands Available | Control Command Format | Feedback Format | Temp. Device | Temp. Device Commands Available | Control Command Format | Feedback Format |
| Inertial Device | Inertial Device Commands Available | Control Command Format | Feedback Format | Volume Device | Volume Device Commands Available | Control Command Format | Feedback Format |
| Antenna | Antenna Commands Available | Control Command Format | Feedback Format | Antenna | Antenna Commands Available | Control Command Format | Feedback Format |
| MOTE 2A OF FIRST-ADMINISTERED SET OF MOTES: ROUTING /SPATIAL INDEX |||| MOTE 4A OF SECOND-ADMINISTERED SET OF MOTES: ROUTING /SPATIAL INDEX ||||
| Mote-Network Address 2A | Comm. Link Quality of Service: Good | Absolute Coordinates: Long Lat. (e.g., GPS) | Relative Coordinates (e.g., 2-d or 3-d relative to mote 1A location) | Mote-Network Address 1A | Comm. Link Quality of Service: Good | Absolute Coordinates: Long Lat. (e.g., GPS) | Relative Coordinates (e.g., 2-d or 3-d relative to mote 1A location) |
| Mote-Network Address 3A | Comm. Link Quality of Service: Fair | Absolute Coordinates: Long Lat. (e.g., GPS) | Relative Coordinates (e.g., 2-d or 3-d relative to mote 1A location) | Mote-Network Address 2A | Comm. Link Quality of Service: Fair | Absolute Coordinates: Long Lat. (e.g., GPS) | Relative Coordinates (e.g., 2-d or 3-d relative to mote 1A location) |
| Mote-Network Address 5A | Comm. Link Quality of Service: Poor | Absolute Coordinates: Long Lat. (e.g., GPS) | Relative Coordinates (e.g., 2-d or 3-d relative to mote 1A location) | Mote-Network Address 5A | Comm. Link Quality of Service: Poor | Absolute Coordinates: Long Lat. (e.g., GPS) | Relative Coordinates (e.g., 2-d or 3-d relative to mote 1A location) |
| | | | | Mote-Network Address 6A | Comm. Link Quality of Service: Fair | Absolute Coordinates: Long Lat. (e.g., GPS) | Relative Coordinates (e.g., 2-d or 3-d relative to mote 1A location) |

FIG. 11

FEDERATING MOTE-ASSOCIATED INDEX DATA

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s); the present application also claims the earliest available effective filing date(s) from, and also incorporates by reference in its entirety all subject matter of any and all parent, grandparent, great-grandparent, etc. applications of the following listed application(s):
1. United States patent application entitled MOTE-ASSOCIATED INDEX CREATION, naming Edward K. Y. Jung and Clarence T. Tegreene as inventors, filed substantially contemporaneously herewith.
2. United States patent application entitled TRANSMISSION OF MOTE-ASSOCIATED INDEX DATA, naming Edward K. Y. Jung and Clarence T. Tegreene as inventors, filed substantially contemporaneously herewith.
3. United States patent application entitled AGGREGATING MOTE-ASSOCIATED INDEX DATA, naming Edward K. Y. Jung and Clarence T. Tegreene as inventors, filed substantially contemporaneously herewith.
4. United States patent application entitled TRANSMISSION OF AGGREGATED MOTE-ASSOCIATED INDEX DATA, naming Edward K. Y. Jung and Clarence T. Tegreene as inventors, filed substantially contemporaneously herewith.
5. United States patent application entitled MOTE NETWORKS HAVING DIRECTIONAL ANTENNAS, naming Clarence T. Tegreene as inventor, filed substantially contemporaneously herewith.
6. United States patent application entitled MOTE NETWORKS USING DIRECTIONAL ANTENNA TECHNIQUES, naming Clarence T. Tegreene as inventor, filed substantially contemporaneously herewith.

TECHNICAL FIELD

The present application relates, in general, to motes.

SUMMARY

In one aspect, a method includes but is not limited to: creating one or more first-administered content indexes for a first set of motes; obtaining at least a part of the one or more first-administered content indexes of the first set of motes; creating one or more second-administered content indexes for a second set of motes; obtaining at least a part of the second-administered content indexes of the second set of motes; and creating a federated index from at least a part of the one or more first-administered content indexes and at least a part of the one or more second-administered content indexes. In addition to the foregoing, other method aspects are described in the claims, drawings, and/or text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a method includes but is not limited to: obtaining at least a part of a first-administered content index from a first set of motes; obtaining at least a part of a second-administered content index from a second set of motes; and creating a federated index from at least a part of the first-administered content index and at least a part of the second-administered content index. In addition to the foregoing, other method aspects are described in the claims, drawings, and/or text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to: at least one computational system operably coupled with at least one of a first-administered set of motes or a second-administered set of motes; and at least one federated index creation agent resident in the computational system, said at least one at least one federated index creation agent configured to create at least a part of a federated index. In addition to the foregoing, other system aspects are described in the claims, drawings, and/or text forming a part of the present application.

In one aspect, a system includes but is not limited to: at least one computational system operably coupled with at least one of a first-administered set of motes or a second-administered set of motes; and at least one federated index resident in the computational system, said at least one at least one federated index configured to contain at least a part of at least one of mote-addressed content index or a multi-mote content index. In addition to the foregoing, other system aspects are described in the claims, drawings, and/or text forming a part of the present application.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined by the claims, will become apparent in the detailed description set forth herein.

BRIEF DESCRIPTION OF THE FIGURES

FIG. 11 shows an exemplary exploded view of federated index 916.

The use of the same symbols in different drawings typically indicates similar or identical items.

DETAILED DESCRIPTION

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

I. Mote-Associated Index Creation

A. Structure(s) and/or System(s)

Figure 1:
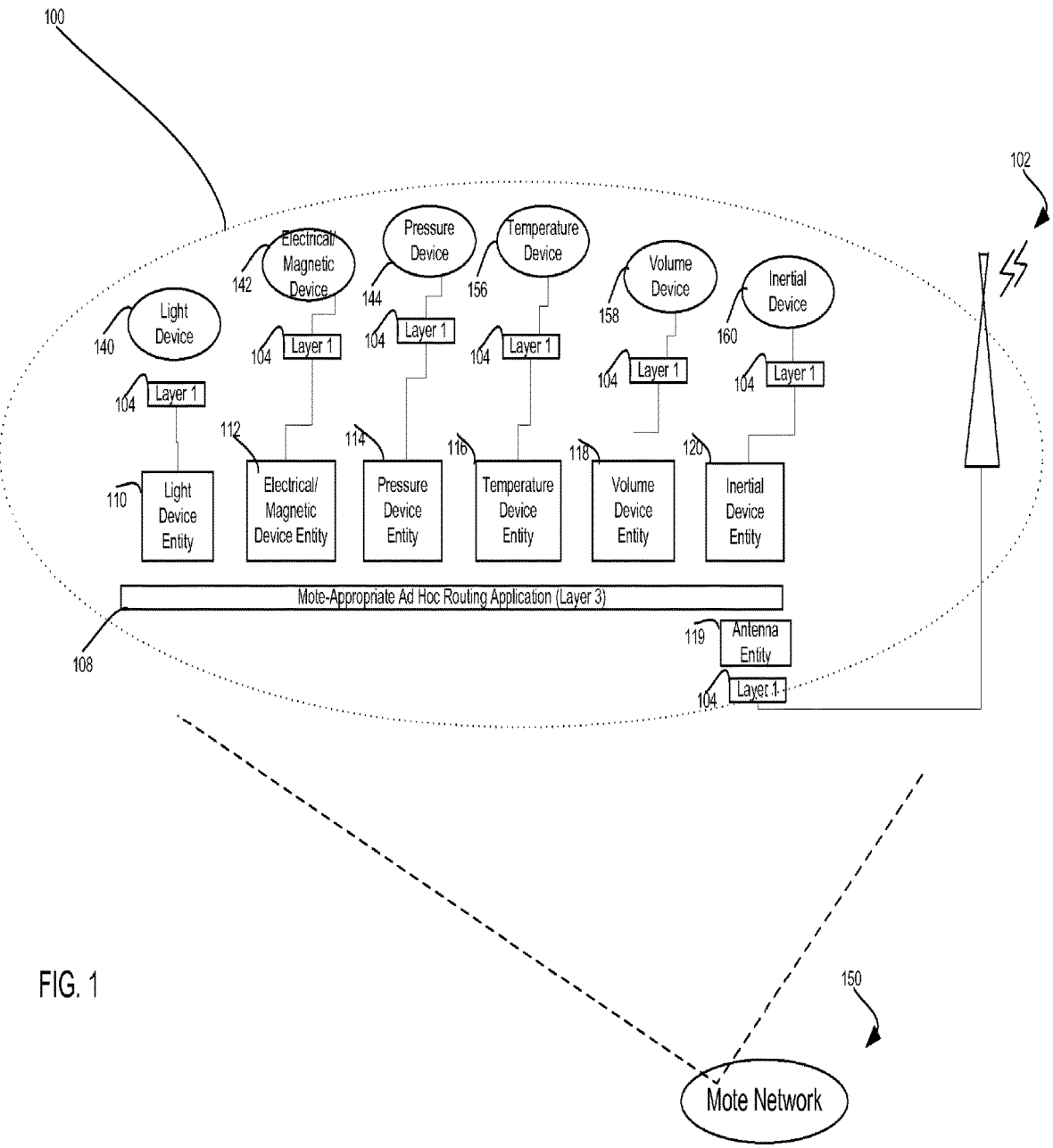
FIG. 1 shows an example of mote 100 of network 150 that may serve as a context of one or more processes and/or devices described herein.

With reference now to FIG. 1, shown is an example of mote 100 of mote-appropriate network 150 that may serve as a context for introducing one or more processes and/or devices described herein. A mote is typically composed of sensors, actuators, computational entities, and/or communications entities formulated, in most cases at least in part, from a substrate. As used herein, the term "mote" typically means a semi-autonomous computing, communication, and/or sensing device as described in the mote literature (e.g., Intel Corporation's mote literature), as well as equivalents recognized by those having skill in the art (e.g., Intel Corporation's smart dust projects). Mote 100 depicts a specific example of a more general mote. Mote 100 is illustrated as having antenna 102, physical layer 104, antenna entity 119, network layer 108 (shown for sake of example as a mote-appropriate ad hoc routing application), light device entity 110, electrical/magnetic device entity 112, pressure device entity 114, temperature device entity 116, volume device entity 118, and inertial device entity 120. Light device entity 110, electrical/magnetic device entity 112, pressure device entity 114, temperature device entity 116, volume device entity 118, antenna entity 119, and inertial device entity 120 are depicted to respectively couple through physical layers 104 with light device 140, electrical/magnetic device 142, pressure device 144, temperature device 156, volume device 158, antenna 102, and inertial device 160. Those skilled in the art will appreciate that the herein described entities and/or devices are illustrative, and that other entities and/or devices consistent with the teachings herein may be substituted and/or added.

Those skilled in the art will appreciate that herein the term "device," as used in the context of devices comprising or coupled to a mote, is intended to represent but is not limited to transmitting devices and/or receiving devices dependent on context. For instance, in some exemplary contexts light device 140 is implemented using one or more light transmitters (e.g., coherent light transmission devices or non-coherent light transmission devices) and/or one or more light receivers (e.g., coherent light reception devices or non-coherent light reception devices) and/or one or more supporting devices (e.g., optical filters, hardware, firmware, and/or software). In some exemplary implementations, electrical/magnetic device 142 is implemented using one or more electrical/magnetic transmitters (e.g., electrical/magnetic transmission devices) and/or one or more electrical/magnetic receivers (e.g., electrical/magnetic reception devices) and/or one or more supporting devices (e.g., electrical/magnetic filters, supporting hardware, firmware, and/or software). In some exemplary implementations, pressure device 144 is implemented using one or more pressure transmitters (e.g., pressure transmission devices) and/or one or more pressure receivers (e.g., pressure reception devices) and/or one or more supporting devices (e.g., supporting hardware, firmware, and/or software). In some exemplary implementations, temperature device 156 is implemented using one or more temperature transmitters (e.g., temperature transmission devices) and/or one or more temperature receivers (e.g., temperature reception devices) and/or one or more supporting devices (e.g., supporting hardware, firmware, and/or software). In some exemplary implementations, volume device 158 is implemented using one or more volume transmitters (e.g., gas/liquid transmission devices) and/or one or more volume receivers (e.g., gas/liquid reception devices) and/or one or more supporting devices (e.g., supporting hardware, firmware, and/or software). In some exemplary implementations, inertial device 160 is implemented using one or more inertial transmitters (e.g., inertial force transmission devices) and/or one or more inertial receivers (e.g., inertial force reception devices) and/or one or more supporting devices (e.g., supporting hardware, firmware, and/or software). Those skilled in the art will recognize that although a quasi-stack architecture is utilized herein for clarity of presentation, other architectures may be substituted in light of the teachings herein. In addition, although not expressly shown, those having skill in the art will appreciate that entities and/or functions associated with concepts underlying Open System Interconnection (OSI) layer 2 (data link layers) and OSI layers 4-6 (transport-presentation layers) are present and active to allow/provide communications consistent with the teachings herein. Those having skill in the art will appreciate that these layers are not expressly shown/described herein for sake of clarity.

Figure 2:
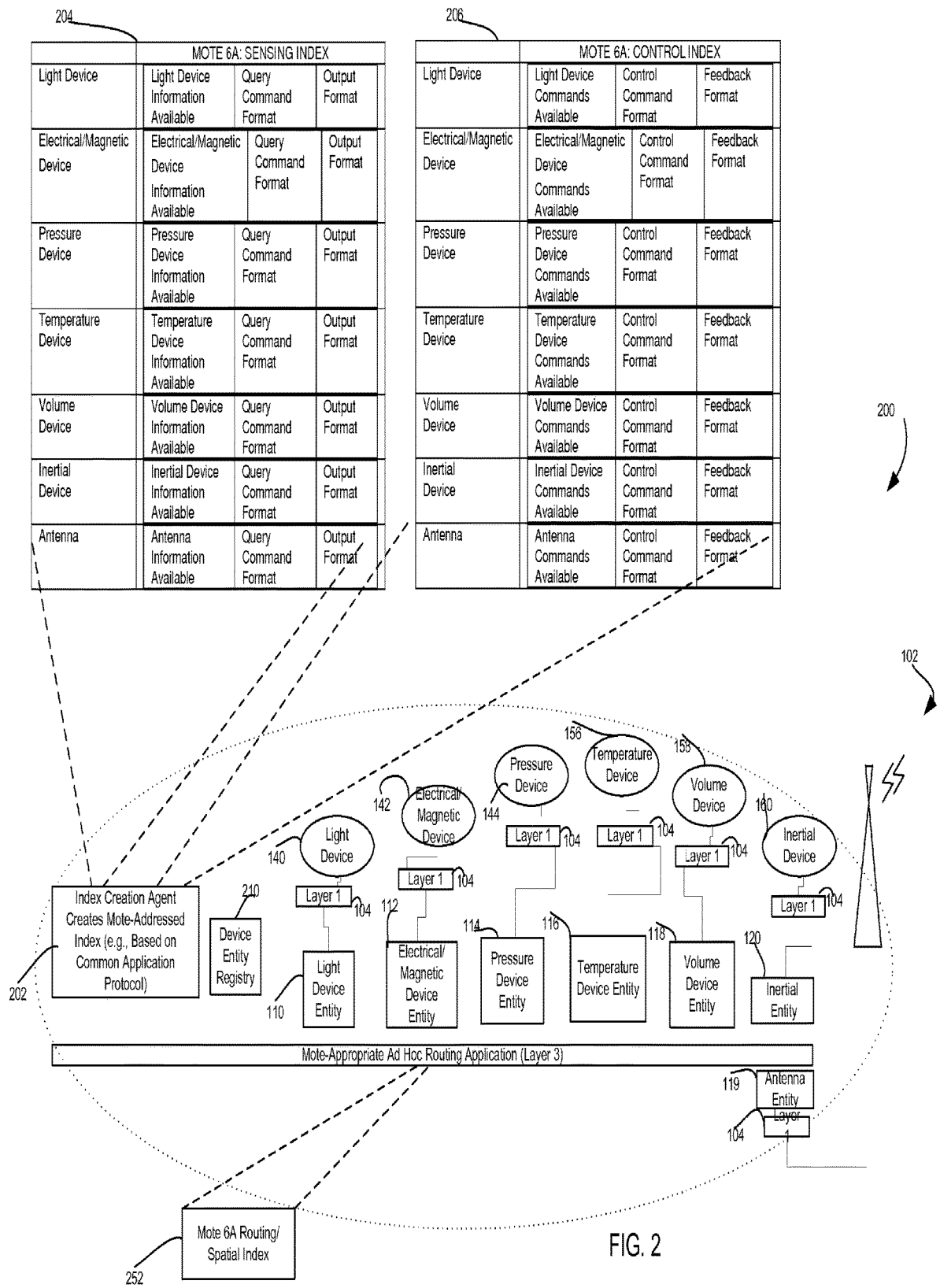
FIG. 2 depicts an exploded view of mote 200.

Referring now to FIG. 2, depicted is an exploded view of mote 200 that forms a part of a mote-appropriate network (e.g., as shown in FIGS. 4, 7, 8, 9, and/or 10). Mote 200 is illustrated as similar to mote 100 (FIG. 1), but with the addition of index creation agent 202, mote-addressed sensing index 204, mote-addressed control index 206, and mote-addressed routing/spatial index 252. Specific instances of mote-addressed control and/or mote-addressed sensing indexes are shown in FIG. 2. For an example of what one implementation of a mote-addressed routing/spatial index might contain, see the mote-addressed routing/spatial indexes shown internal to multi-mote content index 504 of FIG. 5. As shown in FIG. 5, in some implementations a mote-addressed routing/spatial index will contain a listing of mote addresses directly accessible from a mote (e.g., via direct radio transmission/reception from/by antenna 102), an assessment of qualities of data communications service on the data communication links to such directly accessible motes, and/or a listing of relative and/or absolute spatial coordinates of such directly accessible motes.

In one implementation, index creation agent 202 is a computer program—resident in mote 200—that executes on a processor of mote 200 and that constructs and/or stores mote-addressed sensing index 204, mote-addressed control index 206, and/or mote-addressed routing/spatial index 252 in memory of mote 200. In some implementations, index creation agent 202 is pre-installed on mote 200 prior to mote 200 being added to a mote-appropriate network, while in other implementations index creation agent 202 crawls and/or is transmitted to mote 200 from another location (e.g., an index creation agent at another mote or another networked computer (not shown) clones itself and sends that clone to mote 200). In yet other implementations, index creation agent 202 is installed at a proxy (not shown) for mote 200.

The inventors point out that in some applications the systems and/or processes transfer their instructions in a piecewise fashion over time, such as is done in the mote-appropriate Mate' virtual machine of the related art. The inventors also point out that in some applications motes are low-power and/or low bandwidth devices, and thus in some implementations the system(s) and process(es) described herein allow many minutes (e.g., hours, days, or even weeks) for herein described agents and/or processes to migrate to and establish themselves at various nodes. The same may also hold true for transmission of information among nodes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

B. Process(es) and/or Scheme(s)

Mote 200 of FIG. 2 can serve as a context in which one or more processes and/or devices may be illustrated. In one exemplary process, once index creation agent 202 has become active at mote 200, index creation agent 202 communicates with device entity registry 210 to receive device identifiers indicative of device entities present at mote 200 (e.g., light device entity 110, electrical/magnetic device entity 112, pressure device entity 114, etc.). In some implementations, device entities of mote 200 register their presences with device entity registry 210, while in other implementations the operating system of mote 200 registers the device entities when the operating system installs the device entities and/or their associated drivers (if any). In some implementations, once index creation agent 202 becomes aware of what device entities are present, index creation agent 202 communicates with the device entities (e.g., light device entity 110, electrical/magnetic entity 112, pressure entity 114, etc.) to find out what sensing functions are present and/or available at their various respectively associated devices (e.g., light device 140, electrical/magnetic device 142, pressure device 144, etc.), the formats used to query their various respectively associated devices, and the format in which the information will be rendered by their various respectively associated devices; index creation agent 202 also queries the device entities to find out what control functions are present at their various respectively associated devices, the formats used to cause their various respectively associated devices to execute their respective control functions, and the formats in which their various respectively associated devices will render feedback about control command execution. In some implementations, index creation agent 202 also communicates with routing/spatial index 252 to find out the mote-network address of mote 200 (e.g., mote-network address 6A) as well as other spatial information (e.g., mote-network addresses and/or spatial locations of the motes that can be reached directly by wireless link from mote 200; spatial locations may be absolute and/or relative to some marker, such as mote 200 itself). In some implementations, index creation agent 202 communicates with the device entities using a common application protocol which specifies standard interfaces that allow index creation agent 202 to garner the necessary information without knowing the internal workings and/or architectures of each specific device entity. In other implementations, such a common application protocol is not used.

In various implementations, contemporaneous with and/or subsequent to index creation agent 202 communicating with the device entities, index creation unit 202 creates one or more mote-addressed content indexes which in some implementations are associated with the mote-network address of the mote at which index creation unit 202 resides. The inventors point out that examples of the term "index," and/or phrases containing the term "index," exist in the text (e.g., independent claims, dependent claims, detailed description, and/or summary) and/or drawings forming the present application and that such term and/or phrases may have scopes different from like terms and/or phrases used in other contexts. Mote 200 is depicted for sake of illustration as having a mote-address of 6A. Accordingly, specific examples of more general mote-addressed content indexes are shown in FIG. 2 as mote 6A-addressed sensing index 204 and mote 6A-addressed control index 206, which respectively list the sensing and control capabilities in association with device-identifiers associated with devices present and/or available at mote 200; in addition, shown as yet another specific example of more general mote-addressed content indexes is mote 6A-addressed routing/spatial index 252 which typically contains a listing of mote-network addresses of those motes directly accessible from mote 200 and such directly accessible motes' spatial orientations relative to mote 200 and/or some other common spatial reference location (e.g., GPS). In some implementations, index creation unit 202 creates one or more extensible mote-addressed content indexes (e.g., creating the one or more extensible indexes in response to a type of content being indexed). In addition, those having skill in the art will appreciate that while direct mote addressing is shown and described herein for sake of clarity (e.g., mote-appropriate network addresses), the mote addressing described herein may also entail indirect addressing, dependent upon context. Examples of indirect addressing include approaches where a mote-address encodes an address of an agent that in turn produces the address of the mote (analogous to the Domain Name System in the Internet), or where the mote-address directly or indirectly encodes a route to a mote (analogous to explicit or implicit routable addresses.). Those having skill in the art will appreciate that adapting the teachings herein to indirect addressing may be done with a reasonable amount of experimentation, and that such adaptation is not expressly set forth herein for sake of clarity.

As noted herein, a content index may have a device identifier which in various implementations may include an implicit and/or explicit indicator used to reference the specific device at that mote. Those having skill in the art will appreciate that ways in which such may be achieved include the use of a structured name. Those having skill in the art will appreciate that in some implementations mote-local devices may also have global addresses, which may be substituted or allowed to "stand in" for mote addresses.

II. Transmission of Mote-Associated Index Data

A. Structure(s) and/or System(s)

Figure 3:
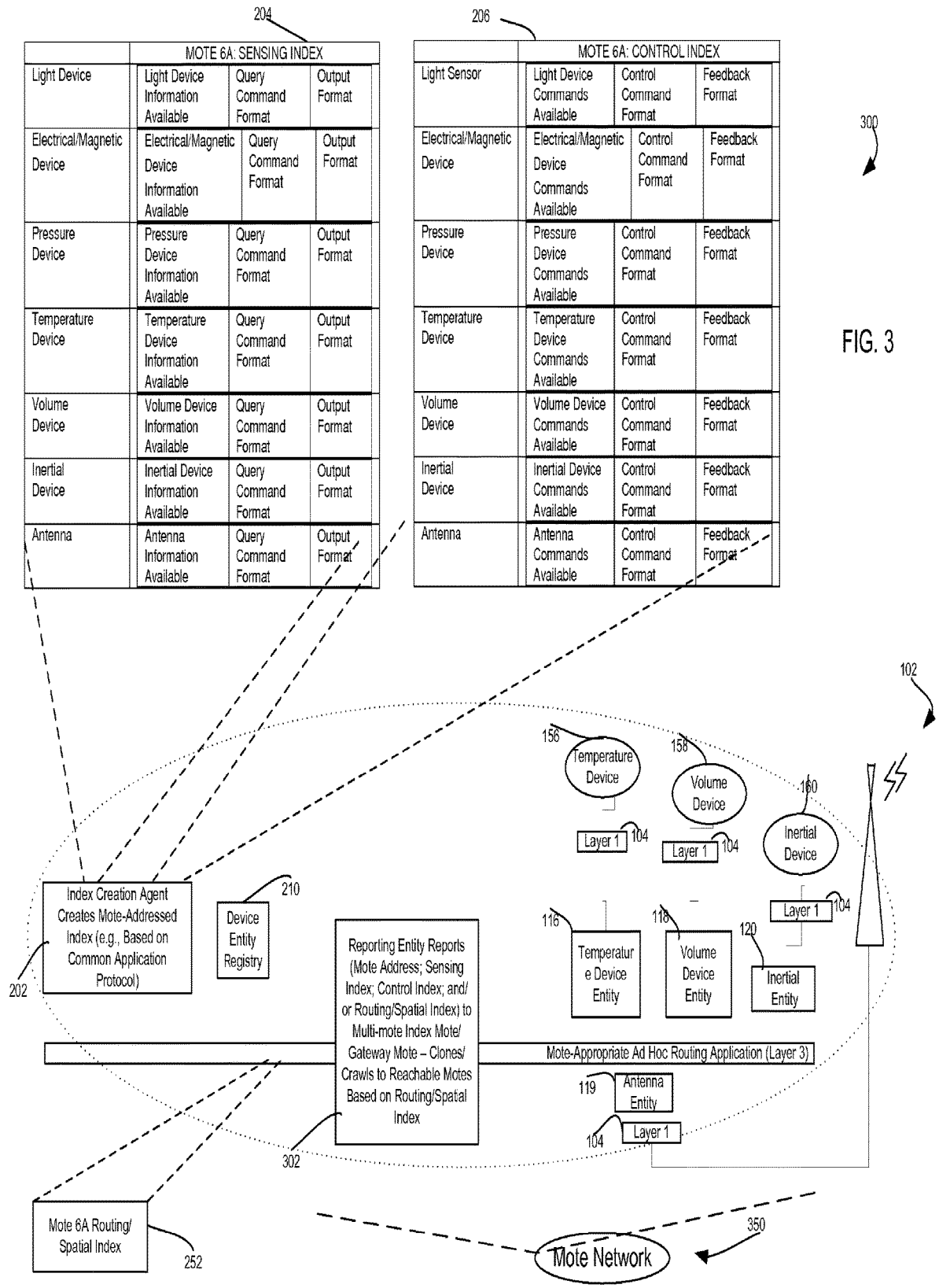
FIG. 3 depicts an exploded view of mote 300.

With reference now to FIG. 3, depicted is an exploded view of mote 300 forming a part of mote-appropriate network 350 that may serve as a context for introducing one or more processes and/or devices described herein. Mote 300 is illustrated as similar to mote 200 (FIG. 2), but with the addition of reporting entity 302. In some implementations, reporting entity 302 is a computer program—resident in mote 300—that executes on a processor of mote 300 and that transmits all or a part of mote-addressed sensing index 204, mote-addressed control index 206, and/or mote-addressed routing/spatial index 252 to another entity (e.g., through antenna 102 to a multi-mote index creation agent such as shown/described in relation to FIG. 5 or through a mote-network to a designated gateway such as shown/described in relation to FIGS. 7, 9, and/or 10). In some implementations, reporting entity 302 is pre-installed on mote 300 prior to mote 300 being added to a mote-appropriate network, while in other implementations reporting entity 302 crawls and/or is transmitted to mote 300 from another location (e.g., a reporting entity at another mote or another networked computer (not shown) clones itself and sends that clone to mote 300). The inventors point out that in some applications the crawling and/or transmissions described herein are performed in a piecewise fashion over time, such as is done in the mote-appropriate Mate' virtual machine of the related art. The inventors also point out that in some applications motes are low-power and/or low bandwidth devices, and thus in some implementations the crawling and/or transmissions described herein allow many minutes (e.g., hours, days, or even weeks) for herein described agents and/or processes to migrate to and establish themselves at various nodes. The same may also hold true for transmission of information among nodes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

B. Process(es) and/or Scheme(s)

Mote 300 of FIG. 3 can serve as a context in which one or more processes and/or devices may be illustrated. In one exemplary process, reporting entity 302 transmits at least a part of a content index to another entity either resident within or outside of mote network 350 (e.g., through antenna 102 to a multi-mote index creation agent such as shown/described in relation to FIG. 5 or through a mote-network to a designated gateway-proximate mote as shown/described in relation to FIGS. 7, 9, and 10). In some implementations, reporting entity 302 transmits in response to a received schedule (e.g., received from multi-mote index creation agent 502 of FIG. 5 or federated index creation agent 914 of FIG. 9 or 10). In some implementations, reporting entity 302 transmits in response to a derived schedule. In another specific implementation, the schedule is derived in response to one or more optimized queries. In some implementations, the schedule is derived in response to one or more stored queries (e.g., previously received or generated queries).

Figure 9:
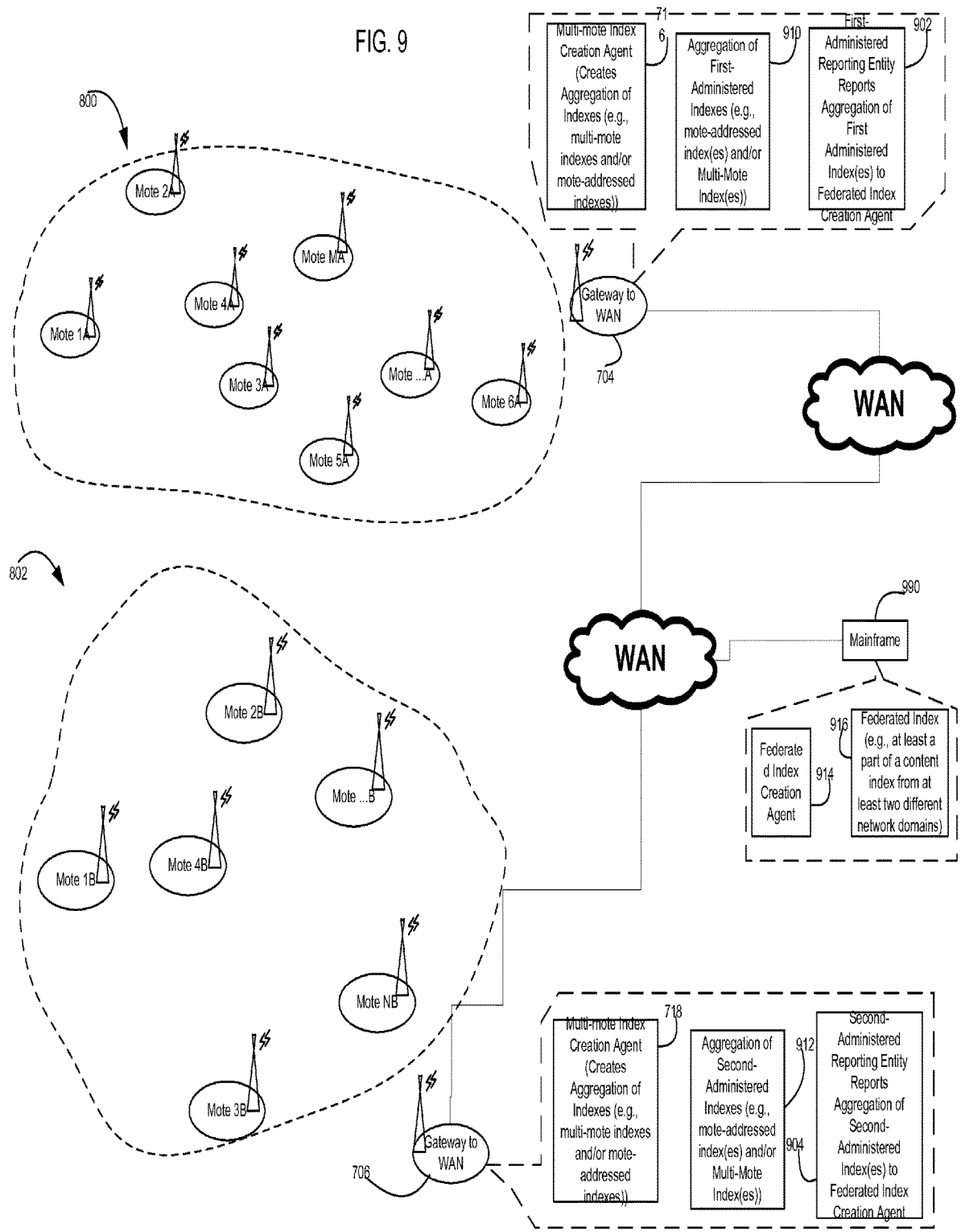
FIG. 9 shows a high-level diagram of first-administered set 800 of motes and second-administered set 802 of motes modified in accordance with teachings of the subject matter described herein.
Figure 10:
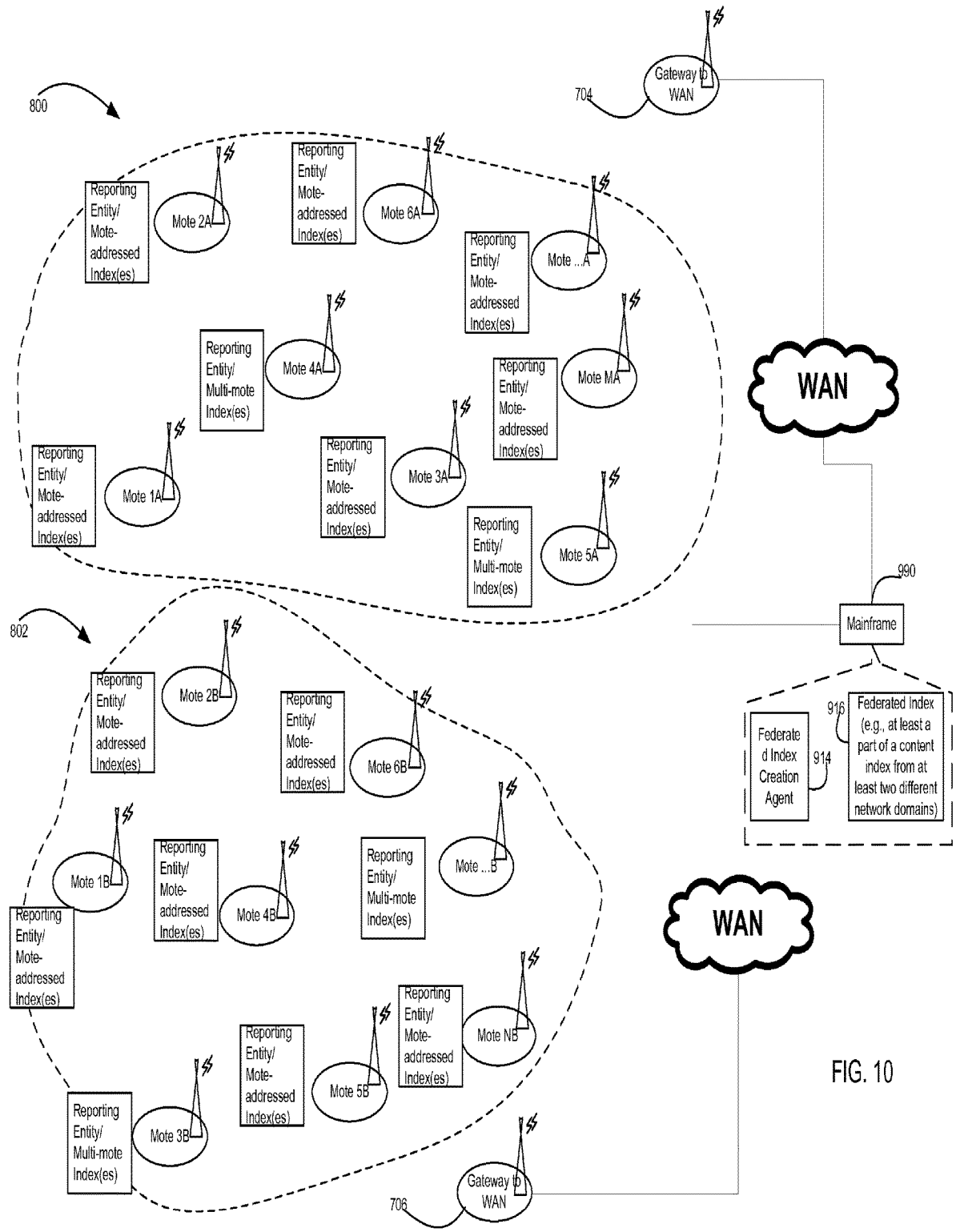
FIG. 10 shows the high-level diagram of FIG. 9, modified to show first-administered set 800 of motes and second-administered set 802 of motes wherein each mote is illustrated as having index(es) (e.g., mote-addressed and/or multi-mote) and an associated reporting entity.

In some implementations, reporting entity 302 transmits in response to a received query (e.g., received from multi-mote index creation agent of FIG. 5 or federated index creation agent of FIG. 9 or 10). In various implementations, reporting entity 302 transmits using either or both public key and private key encryption techniques. In various other implementations, reporting entity 302 decodes previously encrypted data, using either or both public key and private key encryption techniques, prior to the transmitting.

Figure 4:
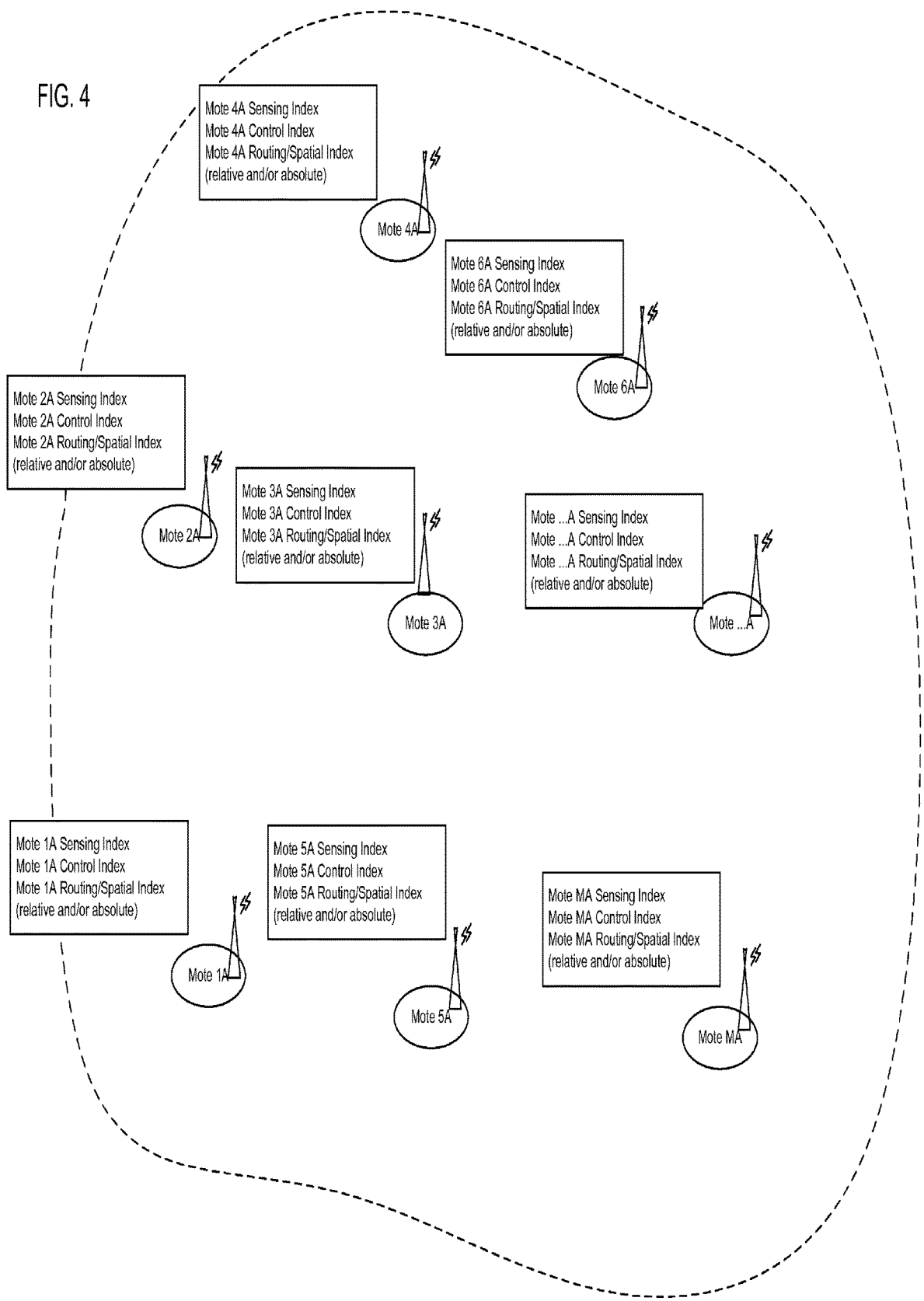
FIG. 4 shows a high-level diagram of a network having a first set of motes addressed 1A through MA, where M is an integer greater than 1, that may form an environment for process(es) and/or device(s) described herein.
Figure 5:
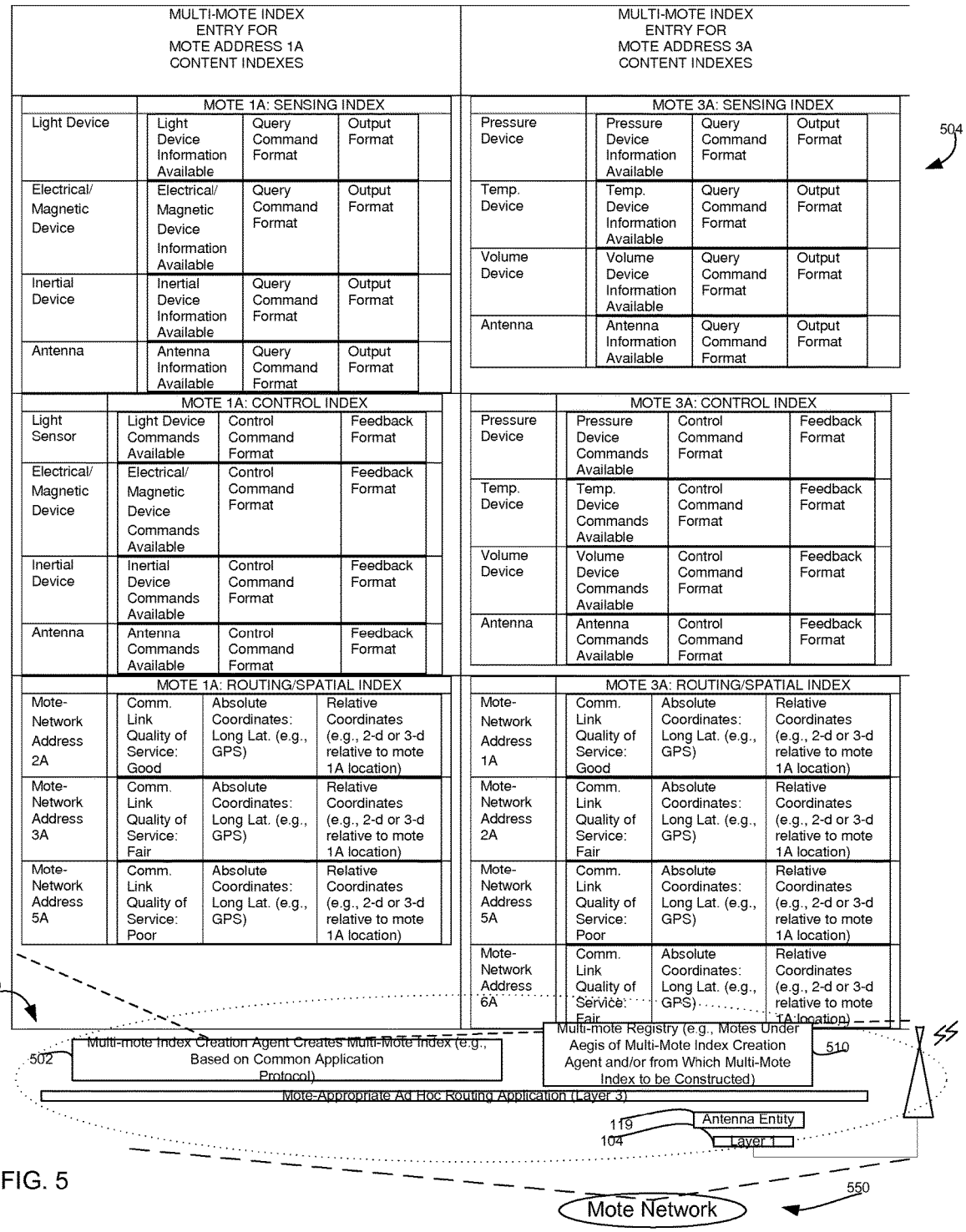
FIG. 5 depicts an exploded view of mote 500 forming a part of mote-appropriate network 550 that may serve as a context for introducing one or more processes and/or devices described herein.

Referring now to FIG. 4, shown is a high-level diagram of a network having a first set of motes addressed 1A through MA (M is an integer greater than 1; A is the letter A and in some instances is used herein to help distinguish differently administered networks as in FIGS. 8, 9, and 10), which may form a context for illustrating one or more processes and/or devices described herein. Each mote is shown as having a mote-addressed content index that includes a sensing index, a control index, and/or a routing/spatial index respectively associated with the sensing functions at each such mote, and/or control functions at each such mote, and/or the spatial locations (relative and/or absolute) of motes that can be reached by direct transmission from each such mote. In some implementations, the motes' various indexes are created and/or function in fashions similar to indexes shown and described elsewhere herein (e.g., in relation to FIG. 3). In addition, although not explicitly shown, one or more of the motes of FIG. 4 may include index creation agents and/or reporting entities that are created and/or function in ways analogous to the creation and/or functioning of index creation agents and/or reporting entities as shown and described elsewhere herein (e.g., in relation to FIGS. 2 and/or 3). In some implementations, the reporting entities at each mote transmit all or a part of their mote-addressed content indexes (e.g., mote-addressed sensing indexes, mote-addressed control indexes, and/or mote-addressed routing/spatial indexes) to one or more entities (e.g., multi-mote index creation agent 502 such as shown/described in relation to FIG. 5 or multi-mote index creation agent 716 such as shown/described in relation to FIGS. 7, 9 and 10). In some implementations, such transmissions are done in response to a schedule, and in other implementations such transmissions are done in response to queries from the one or more entities. Such transmissions may be in response to received schedules, in response to schedules derived at least in part from optimized queries, in response to schedules derived at least in part from received queries, and/or in response to received queries such as described here and/or elsewhere herein.

III. Aggregating Mote-Associated Index Data

A. Structure(s) and/or System(s)

With reference now to FIG. 5, depicted is an exploded view of mote 500 forming a part of mote-appropriate network 550 that may serve as a context for introducing one or more processes and/or devices described herein. Mote 500 is illustrated as similar to mote 300 (FIG. 3), but with the addition of multi-mote index creation agent 502, multi-mote content index 504, and multi-mote registry 510 (e.g., a registry of motes under the aegis of multi-mote index creation agent 502 and/or from which multi-mote content index 504 is to be constructed). Multi-mote content index 504 typically contains at least a part of content indexes from at least two differently-addressed motes. As an example of the foregoing, multi-mote content index 504 is shown containing sensing mote-addressed indexes, mote-addressed control indexes, and mote-addressed routing/spatial indexes for two differently addressed motes: a mote having mote-network address of 1A and a mote having a mote-network address of 3A. In some implementations, the sensing indexes, control indexes, and/or routing/spatial indexes function more or less analogously to mote-addressed sensing index 204, mote-addressed control index 206, and/or mote-addressed routing/spatial index 252 of mote 200 (e.g., as shown and described in relation to FIG. 2). In some implementations, multi-mote index creation agent 502 is a computer program—resident in mote 500—that executes on a processor of mote 500 and that constructs and stores multi-mote content index 504 in memory of mote 500. In some implementations, multi-mote index creation agent 502 is pre-installed on mote 500 prior to mote 500 being added to a mote-appropriate network, while in other implementations multi-mote index creation agent 502 crawls and/or is transmitted to mote 500 from another location (e.g., a multi-mote index creation agent at another mote or another networked computer (not shown) clones itself and sends that clone to mote 500). The inventors point out that in some applications the crawling and/or transmissions described herein are performed in a piecewise fashion over time, such as is done in the mote-appropriate Mate' virtual machine of the related art. The inventors also point out that in some applications motes are low-power and/or low bandwidth devices, and thus in some implementations the crawling and/or transmissions described herein allow many minutes (e.g., hours, days, or even weeks) for herein described agents and/or processes to migrate to and establish themselves at various nodes. The same may also hold true for transmission of information among nodes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

B. Process(es) and/or Scheme(s)

Mote 500 of FIG. 5 can serve as a context in which one or more processes and/or devices may be illustrated. In one exemplary process, once multi-mote index creation agent 502 has become active at mote 500, multi-mote index creation agent 502 obtains a listing of motes from which multi-mote content index 504 is to be constructed (e.g., a listing of motes making up a part of mote network 550). In some implementations, multi-mote index creation agent 502 obtains the listing of motes from which multi-mote content index 504 is to be constructed by communicating with multi-mote registry 510 to learn what mote-network addresses multi-mote index creation agent 502 is to consult to create multi-mote content index 504. In some implementations, various index creation agents at various respective motes (e.g., the index creation agents at the motes of FIG. 4) register their mote addresses with multi-mote registry 510, while in other implementations an administrator (e.g., either at or remote from mote 500) registers the mote-addresses in multi-mote registry 510. In some implementations, a system administrator places various motes under the aegis of particular multi-mote index creation agents based on single or combined criteria such as spatial locations, bandwidths, qualities of service of data communication links, and/or contents of data captured at various particular nodes. In other implementations, multi-mote index creation agent 502 is pre-loaded with knowledge of the listing of motes from which multi-mote content index 504 is to be constructed. In yet other implementations, the listing of motes from which multi-mote content index 504 is to be constructed is obtained from various motes that inform multi-mote index creation agent 502 that such various motes are to be included in the listing. Those having skill in the art will appreciate that other mechanisms for obtaining the listing, consistent with the teachings herein, may be substituted.

In some implementations, once multi-mote index creation agent 502 becomes aware of the mote-addresses for which it (multi-mote index creation agent 502) is responsible, multi-mote index creation agent 502 communicates with the various respective reporting entities at the various motes for which multi-mote index creation agent 502 is responsible and receives all or part of various respective mote-addressed content indexes (e.g., at least a part of one or more sensing indexes, one or more control indexes, and/or one or more routing/spatial indexes such as shown and described elsewhere). Thereafter, multi-mote index creation agent 502 uses the various reported mote-addressed content indexes to construct and/or save multi-mote content index 504 by aggregating at least a part of mote-addressed content indexes from two separately addressed and/or actually separate motes. For example, multi-mote content index 504 is shown as an aggregate of sensing, control, and routing/spatial indexes for motes having mote-network addresses of 1A and 3A, although typically multi-mote content indexes will index more than just two motes.

In some implementations, multi-mote index creation agent 502 receives all or part of various respective mote-addressed content indexes from various respective reporting entities at various motes which transmit in response to a schedule (e.g., once every 18 minutes). In some implementations, the schedule may be received, pre-stored, and/or derived (e.g., such as shown/described in relation to other transmissions described elsewhere herein). In addition, while the present application describes multi-mote index creation agent 502 receiving all or part of various respective mote-addressed content indexes from the various respective reporting entities at the various motes (e.g., mote 1A and/or mote 3A), those having ordinary skill in the art will appreciate that in other implementations multi-mote index creation agent 502 receives all or part of such indexes from one or more motes representing the first set of motes.

In various implementations discussed herein, multi-mote index creation agent 502 receives mote-addressed content indexes transmitted by reporting entities of various motes from which multi-mote index creation agent 502 creates multi-mote content index 504. In other implementations, multi-mote index creation agent 502 receives one or more previously-created multi-mote content indexes transmitted by multi-mote reporting entities at various motes from which multi-mote index creation agent 502 creates multi-mote content index 504. That is, in some implementations, multi-mote index creation agent 502 creates multi-mote content index 504, at least in part, from a previously generated aggregate of mote-addressed content indexes (e.g., from a previously generated multi-mote content index). In some implementations, such received multi-mote content indexes have been created by other multi-mote index creation agents resident at other motes throughout a mote network (e.g., a mote network such as shown in FIG. 4). Subsequent to receiving such previously created multi-mote content indexes, multi-mote index creation agent 502 then aggregates the multi-mote content indexes to form another multi-mote content index. In yet other implementations, multi-mote index creation agent 502 aggregates both mote-addressed content indexes and multi-mote content indexes respectively received from various reporting entities to create a multi-mote content index. The inventors point out that in some applications motes are low-power and/or low bandwidth devices, and thus in some implementations the systems and processes described herein allow many minutes (e.g., hours, days, or even weeks) for herein described agents and processes to migrate to and establish themselves at various nodes (e.g., by transferring their instructions in a piecewise fashion over time). The same may also hold true for transmission of information among nodes.

IV. Transmission of Aggregated Mote-Associated Index Data

A. Structure(s), and/or System(s)

Figure 6:
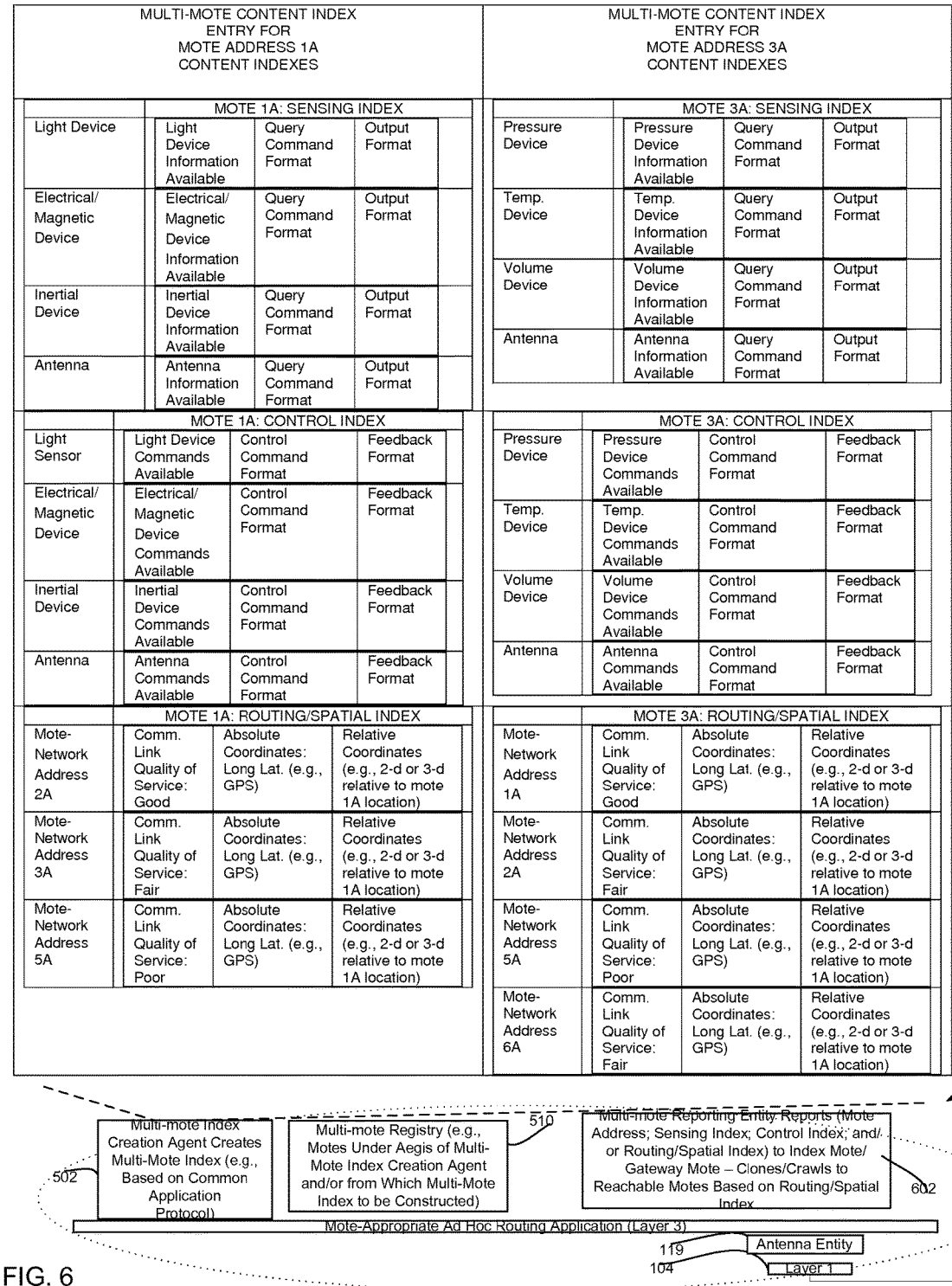
FIG. 6 depicts an exploded view of mote 600 forming a part of mote-appropriate network 550 (FIG. 5) that may serve as a context for introducing one or more processes and/or devices described herein.

With reference now to FIG. 6, depicted is an exploded view of mote 600 forming a part of mote-appropriate network 550 (FIG. 5) that may serve as a context for introducing one or more processes and/or devices described herein. Mote 600 is illustrated as similar to mote 500 (FIG. 5), but with the addition of multi-mote reporting entity 602. In some implementations, multi-mote reporting entity 602 is a computer program—resident in mote 600—that executes on a processor of mote 600. In some implementations, multi-mote reporting entity 602 is a computer program that is pre-installed on mote 600 prior to mote 600 being added to a mote-appropriate network, while in other implementations multi-mote reporting entity 602 is a computer program that crawls and/or is transmitted to mote 600 from another location (e.g., a reporting entity at another mote or another networked computer (not shown) clones itself and sends that clone to mote 600). The inventors point out that in some applications the crawling and/or transmissions described herein are performed in a piecewise fashion over time, such as is done in the mote-appropriate Mate' virtual machine of the related art. The inventors also point out that in some applications motes are low-power and/or low bandwidth devices, and thus in some implementations the crawling and/or transmissions described herein allow many minutes (e.g., hours, days, or even weeks) for herein described agents and/or processes to migrate to and establish themselves at various nodes. The same may also hold true for transmission of information among nodes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

Figure 7:
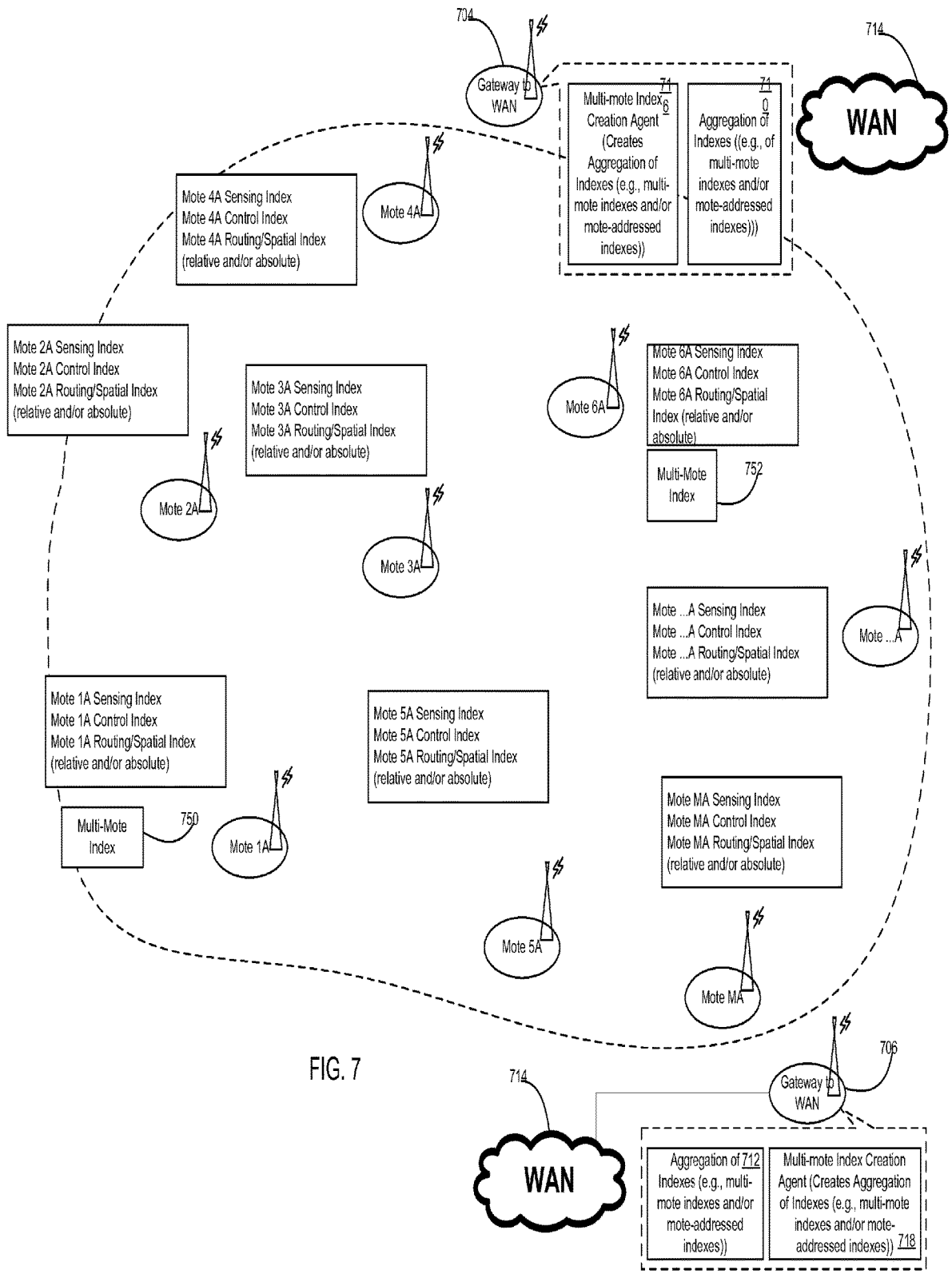
FIG. 7 shows a high-level diagram of an exploded view of mote appropriate network 550 that depicts a first set of motes addressed 1A through MA (M is an integer greater than 1; A is the letter A and in some instances is used herein to help distinguish differently administered networks as in FIGS. 8, 9, and 10), which may form an environment for process(es) and/or device(s) described herein.

Referring now to FIG. 7, shown is a high-level diagram of an exploded view of a mote appropriate network that depicts a first set of motes addressed 1A through MA (M is an integer greater than 1; A is the letter A and in some instances is used herein to help distinguish differently administered networks as in FIGS. 8, 9, and 10), which may form an environment for process(es) and/or device(s) described herein. Each mote is shown as having a mote-addressed content index that includes a sensing index, a control index, and/or a routing/spatial index respectively associated with the sensing functions of devices at each such mote, and/or control functions of devices at each such mote, and/or the spatial locations (relative and/or absolute) of motes that can be reached by direct transmission from each such mote. In some implementations, the motes' various indexes are created and/or function in fashions similar to mote-addressed indexes shown and described herein (e.g., in relation to FIGS. 2, 3, and/or FIG. 4). In some implementations, the motes' various indexes are created and/or function in fashions similar to multi-mote content indexes shown and described herein. For example, mote 1A (i.e., mote having mote-network address 1A) and mote 6A (i.e., mote having mote-network address 6A) are shown having multi-mote content indexes 750 and 752 respectively. The multi-mote content indexes are created and/or function in ways analogous to those shown and/or described elsewhere herein.

Mote 4A and mote MA are shown in FIG. 7 as proximate to gateways 704, 706 onto WAN 714 (e.g., the Internet). Multi-mote index creation agents 716, 718 are depicted as executing on the more powerful computational systems of gateways 704, 706 (e.g., mini and/or mainframe computer systems) to create aggregations 710, 712 of indexes. Those having ordinary skill in the art will appreciate that aggregations 710, 712 of indexes may be composed of multi-mote content indexes and/or individual mote-addressed content indexes. Those having ordinary skill in the art will appreciate that aggregations of multi-mote content indexes in themselves may be considered aggregates of one or more individual mote-addressed content indexes and thus types of multi-mote content indexes. Those having ordinary skill in the art will appreciate that multi-mote content indexes in themselves may be considered aggregates of one or more individual mote-addressed content indexes and thus types of aggregations of content indexes.

Although not expressly shown, those having ordinary skill in the art will appreciate that some or all of the motes shown in FIG. 7 typically have reporting entities that function analogously to other reporting entities described herein (e.g., multi-mote reporting entity 602 and/or reporting entity 302). In some implementations, such reporting entities are computer programs that execute on processors of the motes wherein such reporting entities are resident and that transmit all or a part of indexes at their motes (e.g., mote-addressed indexes and/or multi-mote content indexes) to other entities (e.g., multi-mote index creation agents at designated mote addresses and/or designated gateway-proximate motes). In some implementations, reporting entities are pre-installed on motes prior to such motes' insertion to a mote-appropriate network, while in other implementations such reporting entities crawl and/or are transmitted to their respective motes from other locations (e.g., a reporting entity at another mote or another networked computer (not shown) clones itself and sends that clone to another mote). In addition, in some implementations one or more of the reporting entities is given access to the content indexes of the motes and thereafter use such access to report on the content of the motes. The multi-mote content indexes and/or mote-addressed content indexes may be as shown and/or described both here and elsewhere herein, and such elsewhere described material is typically not repeated here for sake of clarity In some implementations, various reporting entities at various motes transmit in response to a schedule (e.g., once every 24 hours). In one specific example implementation, a reporting entity transmits in response to a received schedule (e.g., received from multi-mote index creation agent 502 of FIG. 5 and/or federated index creation agent 914 of FIGS. 9 and/or 10). In another specific example implementation, a reporting entity transmits in response to a derived schedule. In another specific implementation, the schedule is derived in response to one or more optimized queries. In yet other implementations, the schedule is derived in response to one or more stored queries (e.g., previously received or generated queries).

In other implementations, the reporting entities transmit in response to received queries (e.g., received from multi-mote index creation agents or federated index creation agents). In various implementations, the reporting entities transmit using either or both public key and private key encryption techniques. In various other implementations, the reporting entities decode previously encrypted data, using either or both public key and private key encryption techniques, prior to the transmitting.

B. Process(es) and/or Scheme(s)

With reference now again to FIG. 5, FIG. 6, and FIG. 7, the depicted views may serve as a context for introducing one or more processes and/or devices described herein. Some exemplary processes include the operation of transmitting at least a part of an aggregate of one or more mote-addressed content indexes of a first set of motes. In one instance, multi-mote reporting entity 602 transmits at least a part of multi-mote content index 504 to another entity (e.g., another multi-mote index creation agent at a designated mote address, or a designated gateway-proximate mote or a federated index creation agent such as shown and/or described in relation to FIGS. 7, 9, and/or 10). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of transmitting at least a part of one or more multi-mote content indexes of the first set of motes. In one instance, multi-mote reporting entity 602 transmits at least a part of at least one of a mote-addressed sensing index or a mote-addressed control index of multi-mote content index 504 to another entity (e.g., another multi-mote index creation agent at a designated mote address, or a designated gateway-proximate mote or a federated index creation agent such as shown and/or described in relation to FIGS. 7, 9, and/or 10). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of transmitting at least a part of a mote-addressed routing/spatial index. In one instance, multi-mote reporting entity 602 transmits at least a part of a mote-addressed routing/spatial index of multi-mote content index 504 to another entity (e.g., another multi-mote index creation agent at a designated mote address, or a designated gateway-proximate mote or a federated index creation agent such as shown and/or described in relation to FIGS. 7, 9, and/or 10). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of effecting the transmitting with a reporting entity. In one instance, multi-mote reporting entity 602 is a logical process at mote 600 that transmits a part of an aggregate of one or more mote-addressed content indexes (e.g., multi-mote indexes and/or aggregations of other indexes such as mote-addressed and multi-mote indexes). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of obtaining access to the one or more mote-addressed content indexes of the first set of motes. In one instance, multi-mote reporting entity 602 is granted the access by an entity such as a system administrator. Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of effecting the transmitting in response to a schedule. In one instance, multi-mote reporting entity 602 transmits at least a part of multi-mote content index 504 in response to a schedule (e.g., once every 24 hours). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of receiving the schedule. In one instance, multi-mote reporting entity 602 transmits at least a part of multi-mote content index 504 in response to a received schedule (e.g., received from multi-mote index creation agent 718 and/or a federated index creation agent 914 of FIGS. 7, 9, and/or 10). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of deriving the schedule. In one instance, multi-mote reporting entity 602 transmits at least a part of multi-mote content index 504 in response to a derived schedule (e.g., derived in response to an optimized query and/or one or more stored queries). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of effecting the transmitting in response to a query. In one instance, multi-mote reporting entity 602 transmits at least a part of multi-mote content index 504 in response to a received query (e.g., received from a multi-mote index creation agent or a federated index creation agent). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of encrypting utilizing at least one of a private or a public key. In one instance, multi-mote reporting entity 602 transmits at least a part of multi-mote content index 504 using either or both public key and private key encryption techniques. Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of decoding at least a part of one or more mote-addressed content indexes utilizing at least one of a public key or a private key. In one instance, multi-mote reporting entity 602 decodes previously encrypted data, using either or both public key and private key encryption techniques, prior to the transmitting of at least a part of multi-mote content index 504. Those skilled in the art will appreciate that the foregoing specific exemplary processes are representative of more general processes taught elsewhere herein, such as in the claims filed herewith and/or elsewhere in the present application.

V. Federating Mote-Associated Index Data

A. Structure(s) and/or System(s)

Figure 8:
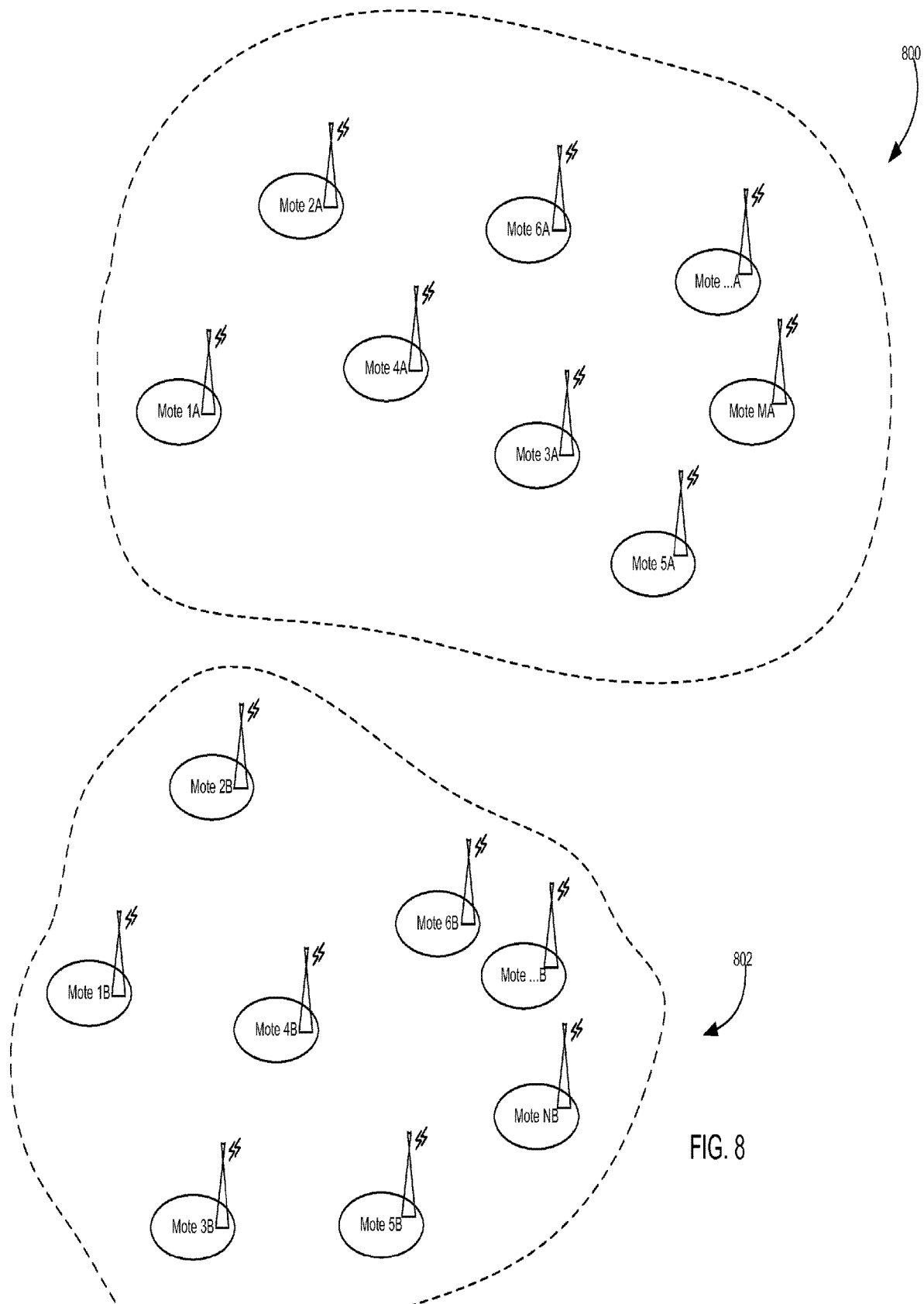
FIG. 8 shows a high-level diagram of first-administered set 800 of motes addressed 1A through MA, and second-administered set 802 of motes addressed 1B through NB (M and N are integers greater than 1; A and B are letters used herein to help distinguish differently administered networks as in FIGS. 8, 9, and 10) that may form an environment for process(es) and/or device(s) described herein.

Referring now to FIG. 8, shown is a high-level diagram of first-administered set 800 of motes addressed 1A through MA, and second-administered set 802 of motes addressed 1B through NB (M and N are integers greater than 1; A and B are letters used herein to help distinguish differently administered networks as in FIGS. 8, 9, and 10) that may form an environment for process(es) and/or device(s) described herein. In some implementations, first-administered set 800 of motes constitutes all or part of a network under a first administrator and second-administered set 802 of motes constitutes all or part of a network under a second administrator, where the first and/or second administrators tend not to have any significant knowledge of the internal operations of networks they don't administer. Examples in which this may be the case are where first-administered set 800 and second-administered set 802 are owned by different business entities, and where first-administered set 800 and second-administered set 802 have been constructed for two separate purposes (e.g., one set to monitor crops and the other set to monitor building systems, and thus the systems were not designed to interact with each other). In some implementations, first-administered set 800 of motes constitutes all or part of a network under a first administrator and second-administered set 802 of motes constitutes all or part of a network under a second administrator, where either or both of the first administrator and the second administrator has some knowledge of the networks they don't administer, but the networks are administered separately for any of a variety of reasons such as security, current employment, permissions, job function distinction, organizational affiliation, workload management, physical location, network disconnection, bandwidth or connectivity differences, etc. In some implementations, first-administered set 800 of motes constitutes all or part of a network under a first transient administration and second-administered set 802 of motes constitutes all or part of a network under a second transient administration, where either or both the first and second transient administrations are those such as might exist when a network partitions or a signal is lost.

The inventors have noticed that in some instances it could be advantageous for one or more systems to use resources from first-administered set 800 of motes and second-administered set 802 of motes. The inventors have devised one or more processes and/or devices that allow systems to use resources in such a fashion.

With reference now to FIG. 9, shown is a high-level diagram of first-administered set 800 of motes and second-administered set 802 of motes modified in accordance with teachings of subject matter described herein. Shown respectively proximate to first-administered set 800 of motes and second-administered set 802 of motes are gateways 704, 706 onto WAN 714. Gateways 704, 706 are respectively shown as having resident within them multi-mote index creation agents 716, 718 and aggregations 910, 912 of first-administered set 800 of motes and second-administered set 802 of motes. The gateways, multi-mote index creation agents, and aggregations are created and/or function substantially analogously to the gateways, index creation agents, and aggregations of indexes described elsewhere herein (e.g., in relation to FIGS. 6 and/or 7), and are not explicitly described here for sake of clarity. For example, aggregation 910 of first-administered indexes and aggregation 912 of second-administered indexes can be composed of either or both mote-addressed and/or multi-mote content indexes and in themselves can be considered instances of multi-mote content indexes. Furthermore, although not expressly shown in FIG. 9 for sake of clarity, it is to be understood that in general most motes will have one or more index creation agents (e.g., multi-mote or other type), indexes (e.g., multi-mote or other type), and/or reporting entities (e.g., multi-mote or other type) resident within or proximate to them (see, e.g., FIG. 10). In some implementations, the functioning and/or creation of such indexes, agents, and/or entities is under the control of federated index creation agent 914. In some implementations, federated index creation agent 914, on an as-needed basis, disperses and/or activates various index creation agents and/or their associated reporting entities (e.g., as shown and described in relation to FIGS. 2, 3, and/or 4), and/or various multi-mote index creation agents and/or their associated reporting entities (e.g., as shown and described in relation to FIGS. 5, 6, and/or 7) throughout first-administered set 800 of motes and second-administered set 802 of motes. In some implementations, such dispersals and/or activations are done on an as-needed basis, while in other implementations such dispersals and activations are pre-programmed. In yet other implementations, the agents, indexes, and/or entities are pre-programmed.

Further shown in FIG. 9 are federated index creation agent 914 and federated index 916 resident within mainframe computer system 990, which in some implementations are dispersed, created, and/or activated in fashions similar to other index creation agents and indexes described herein. In some implementations, federated index creation agent 914 generates federated index 916 by obtaining at least a part of one or more indexes (e.g., multi-mote or mote-addressed indexes) from both first-administered set 800 of motes and second-administered set 802 of motes. In some implementations, federated index 916 typically includes at least a part of a content index from two differently-administered mote networks, such as first-administered set 800 of motes and second-administered set 802 of motes In some implementations, federated index 916 has one or more entries denoting one or more respective administrative domains of one or more content index entries (e.g., see federated index 916 of FIG. 11). In other implementations, federated index 916 has access information to one or more content indexes for an administered content index (e.g., in some implementations, this is actually in lieu of a content index). In other implementations, federated index 916 has information pertaining to a currency of at least one entry of an administered content index. In other implementations, federated index 916 has information pertaining to an expiration of at least one entry of an administered content index. In other implementations, federated index 916 has metadata pertaining to an administrative domain, wherein the metadata includes at least one of an ownership indicator, an access right indicator, an index refresh indicator, or a predefined policy indicator. In other implementations, federated index 916 has an administrative domain-specific query string generated for or supplied by an administrative domain to produce an updated content index for that domain.

Continuing to refer to FIG. 9, aggregation 910 of first-administered index and aggregation 912 of second-administered index (e.g., instances of multi-mote content indexes) are shown as respectively interfacing with first-administered reporting entity 902 and second-administered reporting entity 904. First-administered reporting entity 902 and/or second-administered reporting entity 904 typically are dispersed, created, and/or activated in fashions analogous to the dispersal, creation, and/or activation of other reporting entities as described elsewhere herein (e.g., in relation to FIGS. 3 and/or 6), and hence such dispersals, creations, and/or activations are not explicitly described here for sake of clarity.

In some implementations, first-administered reporting entity 902 and/or second-administered reporting entity 904 transmit all/part of their respective multi-mote content indexes to federated index creation agent 914, from which federated index creation agent creates federated index 916. First-administered reporting entity 902 and/or second-administered reporting entity 904 transmit in manners analogous to reporting entities discussed elsewhere herein. For example, transmitting in response to schedules received, schedules derived, and/or queries received from federated index creation agent 914, and/or transmitting using either or both public key and private key encryption techniques and/or decoding previously encrypted data, using either or both public key and private key encryption techniques, prior to the transmitting.

In the discussion of FIG. 9, federated index creation agent 914 was described as obtaining portions of aggregations of first-administered and second-administered network indexes from which federated index 916 was constructed. In other implementations, federated index creation agent 914 obtains portions of first-administered and second-administered network indexes from various reporting entities dispersed throughout the first-administered and second-administered mote networks 802, 804 (e.g., multi-mote or other type reporting entities such as those described in relation to FIGS. 3, 6 and/or elsewhere herein). Such reporting entities and indexes are implicit in FIG. 9 (e.g., since the multi-mote creation agents 716, 718 would typically interact with such reporting entities to obtain indexes under the purview of such entities), but are explicitly shown and described in relation to FIG. 10. In other implementations, the various reporting entities dispersed throughout the networks report directly to federated index creation agent 914. One example of such implementations is shown and described in relation to FIG. 10.

Referring now to FIG. 10, shown is the high-level diagram of FIG. 9, modified to show first-administered set 800 of motes and second-administered set 802 of motes wherein each mote is illustrated as having index(es) (e.g., mote-addressed and/or multi-mote) and an associated reporting entity. The reporting entities may be of substantially any type described herein (e.g., multi-mote or other type) and the indexes may also be of substantially any type described herein (e.g., multi-mote or mote-addressed content indexes).

In some implementations, various reporting entities dispersed throughout first-administered set 800 of motes and second-administered set 802 of motes transmit all/part of their respective indexes (multi-mote or otherwise) to federated index creation agent 914, from which federated index creation agent creates federated index 916. The various reporting entities transmit in manners analogous to reporting entities discussed elsewhere herein. For example, transmitting in response to schedules received, schedules derived, and/or queries received from federated index creation agent 914, and/or transmitting using either or both public key and private key encryption techniques and/or decoding previously encrypted data, using either or both public key and private key encryption techniques, prior to the transmitting.

With reference now to FIG. 11, shown is an exemplary exploded view of federated index 916. Federated index 916 is shown to contain aggregations of content indexes drawn from first-administered set 800 of motes and second-administered set 802 of motes. Shown is that federated index 916 contains aggregated sensing, control, and routing/spatial indexes for motes addressed 1A and 2A under the administration of a first network administrator. Depicted is that federated index 916 contains aggregated sensing, control, and routing/spatial indexes for motes addressed 3A and 4A under the administration of a second network administrator. Although aggregations for only two administered networks are shown, those having ordinary skill in the art will appreciate that in some implementations the number of administered networks indexed could be several. In addition, although each individual administrator-specific aggregation is shown containing entries for only three motes, those having skill in the art will appreciate that in most implementations the number of motes in the aggregations will run to the hundreds, thousands, and/or higher.

B. Process(es) and/or Scheme(s)

With reference now again to FIG. 7, FIG. 8, FIG. 9, FIG. 10, and/or FIG. 11, the depicted views may serve as a context for introducing one or more processes and/or devices described herein. Some exemplary processes include the operations of obtaining at least a part of a first-administered content index from a first set of motes; obtaining at least a part of a second-administered content index from a second set of motes; and creating a federated index from at least a part of the first-administered content index and at least a part of the second-administered content index. Other more general exemplary processes of the foregoing specific exemplary processes are taught at least in the claims and/or elsewhere in the present application.

In some specific exemplary processes, the operation of obtaining at least a part of a first-administered content index from a first set of motes includes but is not limited to the operation of receiving at least a part of one or more multi-mote content indexes of the first set of motes. For example, federated index creation agent 914 receiving at least a part of the multi-mote content index of mote 6A (e.g., such as shown and described in relation to FIGS. 7, 8, 9, 10, and/or 11).

In some specific exemplary processes, the operation of receiving at least a part of one or more multi-mote content indexes of the first set of motes includes but is not limited to the operation of receiving at least a part of at least one of a mote-addressed sensing index or a mote-addressed control index from at least one aggregation of one or more first-administered indexes. For example, federated index creation agent 914 receiving at least a part of aggregation of first-administered index(es) 910 as transmitted by first-administered reporting entity 902 for first-administered set 800 of motes (e.g., as shown and/or described in relation to FIGS. 7, 8, 9, 10 and/or 11).

In some specific exemplary processes, the operation of receiving at least a part of one or more multi-mote content indexes of the first set of motes includes but is not limited to the operation of receiving at least a part of a mote-addressed routing/spatial index from at least one aggregation of one or more first-administered indexes. For example, federated index creation agent 914 receiving at least a part of aggregation of first-administered index(es) 910 as transmitted by first-administered reporting entity 902 for first-administered set 800 of motes (e.g., as shown and/or described in relation to FIGS. 7, 8, 9, 10 and/or 11).

In some specific exemplary processes, the operation of receiving at least a part of one or more multi-mote content indexes of the first set of motes includes but is not limited to the operation of receiving at least a part of at least one of a mote-addressed sensing index or a mote-addressed control index from a multi-mote reporting entity at a mote of the first set of motes. For example, federated index creation agent 914 receiving at least a part of one or more multi-mote content indexes of first-administered set 800 of motes from one or more multi-mote content indexes' associated multi-mote reporting entities (e.g., such as shown and/or described in relation to the multi-mote content indexes and/or associated reporting entities of first-administered set 800 of motes of FIGS. 7, 8, 9, 10 and/or 11).

In some specific exemplary processes, the operation of receiving at least a part of one or more multi-mote content indexes of the first set of motes includes but is not limited to the operation of receiving at least a part of a mote-addressed routing/spatial index from a multi-mote reporting entity at a mote of the first set of motes. For example, federated index creation agent 914 receiving at least a part of a mote-addressed routing/spatial index from a multi-mote reporting entity at a mote of the first-administered set 800 of motes (e.g., such as shown and/or described in relation to the multi-mote content index of mote 6A of FIGS. 7, 8, 9, 10 and/or 11).

In some specific exemplary processes, the operation of obtaining at least a part of a first-administered content index from a first set of motes includes but is not limited to the operation of receiving at least a part of at least one of a mote-addressed sensing index or a mote-addressed control index from a reporting entity at a mote of the first set of motes. For example, federated index creation agent 914 receiving at least a part of a mote-addressed sensing index or a mote-addressed control index from one or more associated reporting entities at the motes of first-administered set 800 of motes (e.g., such as shown and/or described in relation the mote-addressed content indexes of motes 3A and/or 5A of FIGS. 7, 8, 9, 10 and/or 11).

In some specific exemplary processes, the operation of obtaining at least a part of a first-administered content index from a first set of motes includes but is not limited to the operation of receiving at least a part of a mote-addressed routing/spatial index from a reporting entity at a mote of the first set of motes. For example, federated index creation agent 914 receiving at least a part of a mote-addressed routing/spatial index from one or more associated reporting entities at the motes of first-administered set 800 of motes (e.g., such as shown and/or described in relation to the mote-addressed content indexes of motes 3A and/or 5A of FIGS. 7, 8, 9, 10 and/or 11).

In some specific exemplary processes, the operation of obtaining at least a part of a second-administered content index from a second set of motes includes but is not limited to the operation of receiving at least a part of one or more multi-mote content indexes of the second set of motes. For example, federated index creation agent 914 receiving at least a part of the multi-mote content index associated with a mote of second-administered set 802 of motes (e.g., such as shown and/or described in relation to FIGS. 7, 8, 9, 10, and/or 11).

In some specific exemplary processes, the operation of receiving at least a part of one or more multi-mote content indexes of the second set of motes includes but is not limited to the operation of receiving at least a part of at least one of a mote-addressed sensing index or a mote-addressed control index from at least one aggregation of one or more second-administered indexes. For example, federated index creation agent 914 receiving at least a part of aggregation of second-administered index(es) 912 as transmitted by second-administered reporting entity 904 for second-administered set 802 of motes (e.g., as shown and/or described in relation to FIGS. 7, 8, 9, 10 and/or 11).

In some specific exemplary processes, the operation of receiving at least a part of one or more multi-mote content indexes of the second set of motes includes but is not limited to the operation of receiving at least a part of a mote-addressed routing/spatial index from at least one aggregation of one or more second-administered indexes. For example, federated index creation agent 914 receiving at least a part of aggregation of second-administered index(es) 912 transmitted by second-administered reporting entity 904 for second-administered set 802 of motes (e.g., as shown and described in relation to FIGS. 7, 8, 9, 10 and/or 11).

In some specific exemplary processes, the operation of receiving at least a part of one or more multi-mote content indexes of the second set of motes includes but is not limited to the operation of receiving at least a part of at least one of a mote-addressed sensing index or a mote-addressed control index from a multi-mote reporting entity at a mote of the second set of motes. For example, federated index creation agent 914 receiving at least a part of one or more multi-mote content indexes of second-administered set 802 of motes from one or more multi-mote content indexes' associated multi-mote reporting entities (e.g., such as shown and described in relation to the multi-mote content indexes and/or reporting entities of second-administered set 802 of motes of FIGS. 7, 8, 9, 10 and/or 11).

In some specific exemplary processes, the operation of receiving at least a part of one or more multi-mote content indexes of the second set of motes includes but is not limited to the operation of receiving at least a part of a mote-addressed routing/spatial index from a multi-mote reporting entity at a mote of the second set of motes. For example, federated index creation agent 914 receiving at least a part of a mote-addressed routing/spatial index from a multi-mote reporting entity at a mote of the second-administered set 802 of motes from an associated multi-mote reporting entity (e.g., such as shown and described in relation to the multi-mote content indexes and/or reporting entities of second-administered set 802 of motes of FIGS. 7, 8, 9, 10 and/or 11).

In some specific exemplary processes, the operation of obtaining at least a part of a second-administered content index from a second set of motes includes but is not limited to the operation of receiving at least a part of at least one of a mote-addressed sensing index or a mote-addressed control index from a reporting entity at a mote of the second set of motes. For example, federated index creation agent 914 receiving at least a part of a mote-addressed sensing index or a mote-addressed control index from one or more associated reporting entities at the motes of second-administered set 802 of motes (e.g., such as shown and described in relation the mote-addressed content indexes and associated reporting entities of second-administered set 802 of motes of FIGS. 7, 8, 9, 10 and/or 11).

In some specific exemplary processes, the operation of obtaining at least a part of a second-administered content index from a second set of motes includes but is not limited to the operation of receiving at least a part of a mote-addressed routing/spatial index from a reporting entity at a mote of the second set of motes. For example, federated index creation agent 914 receiving at least a part of a mote-addressed routing/spatial index from one or more associated reporting entities at the motes of second-administered set 802 of motes (e.g., such as shown and described in relation the mote-addressed content indexes of second-administered set 802 of motes of FIGS. 7, 8, 9, 10, and/or 11).

In some specific exemplary processes, the operation of creating a federated index from at least a part of the first-administered content index and at least a part of the second-administered content index includes the operation of federated index creation agent 914 generating federated index 916 in response to one or more indexes (e.g., multi-mote and/or mote-addressed indexes) obtained from both the first-administered set 800 of motes and the second-administered set 802 of motes. In some implementations, federated index creation agent 914 creates federated index 916 to include at least a part of a content index from two differently-administered mote networks, such as first administered set 800 of motes and second administered set 802 of motes (see., e.g., federated index 916 of FIG. 11). In some implementations, federated index creation agent 914 creates federated index 916 to include one or more entries denoting one or more respective administrative domains of one or more content index entries (e.g., see federated index 916 of FIG. 11). In other implementations, federated index creation agent 914 creates federated index 916 to include access information to one or more content indexes for an administered content index (e.g., in some implementations, this is actually in lieu of a content index). In other implementations, federated index creation agent 914 creates federated index 916 to include information pertaining to a currency of at least one entry of an administered content index. In other implementations, federated index creation agent 914 creates federated index 916 to include information pertaining to an expiration of at least one entry of an administered content index. In other implementations, federated index creation agent 914 creates federated index 916 to include metadata pertaining to an administrative domain, wherein the metadata includes at least one of an ownership indicator, an access right indicator, an index refresh indicator, or a predefined policy indicator. In other implementations, federated index creation agent 914 creates federated index 916 to include an administrative domain-specific query string generated for or supplied by an administrative domain to produce an updated content index for that domain.

In some specific exemplary processes, the operation of creating a federated index from at least a part of the first-administered content index and at least a part of the second-administered content index includes but is not limited to the operations of creating the federated index from at least a part of one or more multi-mote content indexes of the first set of motes; creating the federated index from at least a part of at least one of a mote-addressed sensing index, a mote-addressed control index, or a mote-addressed routing index/spatial index of the first set of motes; creating the federated index from at least a part of one or more multi-mote content indexes of the second set of motes; and/or creating the federated index from at least a part of at least one of a mote-addressed sensing index, a mote-addressed control index, or a mote-addressed routing index/spatial index of the second set of motes. For example, federated index creation agent 914 creating at least a part of federated index 916 in response to portions of multi-mote content indexes (e.g., multi-mote indexes and/or aggregations of indexes) received from reporting entities associated with first administered set 800 of motes and/or second-administered set 802 of motes (e.g., such as shown and described in relation to FIGS. 7, 8, 9, 10 and/or 11).

With reference now again to FIG. 7, FIG. 8, FIG. 9, FIG. 10, and/or FIG. 11, the depicted views may yet again serve as a context for introducing one or more processes and/or devices described herein. Some specific exemplary processes include the operations of creating one or more first-administered content indexes for a first set of motes; obtaining at least a part of the one or more first administered content indexes of the first set of motes; creating one or more second administered content indexes for a second set of motes; obtaining at least a part of the second-administered content indexes of the second set of motes; and creating a federated index from at least a part of the one or more first-administered content indexes and at least a part of the one or more second-administered content indexes.

In some specific exemplary processes, the operations of creating one or more first-administered content indexes for a first set of motes and creating one or more second-administered content indexes for a second set of motes function substantially analogously as the processes described in creating mote-addressed content indexes, mote-addressed indexes, and aggregations of indexes as set forth elsewhere herein (e.g., such as shown and/or described under Roman Numeral headings I ("MOTE-ASSOCIATED INDEX CREATION"), III ("AGGREGATING MOTE-ASSOCIATED INDEX DATA"), and V ("FEDERATING MOTE-ASSOCIATED INDEX DATA"), above, as well as in the as-filed claims). Accordingly, the specific exemplary processes of the operations of creating one or more first-administered content indexes for a first set of motes and creating one or more second-administered content indexes for a second set of motes are not explicitly redescribed here for sake of clarity, in that such specific exemplary processes will be apparent to one of skill in the art in light of the disclosure herein (e.g., as shown and described under Roman Numeral headings I, III, and V, above, as well as in the as-filed claims).

In some specific exemplary processes, the operations of obtaining at least a part of the one or more first-administered content indexes of the first set of motes; obtaining at least a part of the second-administered content indexes of the second set of motes; and creating a federated index from at least a part of the one or more first-administered content indexes and at least a part of the one or more second-administered content indexes function substantially analogously as to like processes described elsewhere herein (e.g., as shown and described under Roman Numeral heading V ("FEDERATING MOTE-ASSOCIATED INDEX DATA"), above, as well as in the as-filed claims). Accordingly, the specific exemplary processes of the operations of obtaining at least a part of the one or more first-administered content indexes of the first set of motes; obtaining at least a part of the second-administered content indexes of the second set of motes; and creating a federated index from at least a part of the one or more first-administered content indexes and at least a part of the one or more second-administered content indexes are not explicitly redescribed here for sake of clarity, in that such specific exemplary processes will be apparent to one of skill in the art in light of the disclosure herein (e.g., as shown and described under Roman Numeral heading V, above, as well as in the as-filed claims).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into mote processing systems. That is, at least a portion of the devices and/or processes described herein can be integrated into a mote processing system via a reasonable amount of experimentation. Those having skill in the art will recognize that a typical mote processing system generally includes one or more of a memory such as volatile and non-volatile memory, processors such as microprocessors and digital signal processors, computational entities such as operating systems, user interfaces, drivers, sensors, actuators, applications programs, one or more interaction devices, such as USB ports, control systems including feedback loops and control motors (e.g., feedback for sensing position and/or velocity; control motors for moving and/or adjusting components and/or quantities). A typical mote processing system may be implemented utilizing any suitable available components, such as those typically found in mote-appropriate computing/communication systems, combined with standard engineering practices. Specific examples of such components include commercially described components such as Intel Corporation's mote components and supporting hardware, software, and firmware.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular aspects of the present subject matter described herein have been shown and described, it will be obvious to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should NOT be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" and/or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of one having skill in the art would understand the convention (e.g., "a system having at least one of A, B, and C" would include but not be limited to systems that have A alone, B alone, C alone, A and B together, A and C together, B and C together, and/or A, B, and C together). In those instances where a convention analogous to "at least one of A, B, or C, etc." is used, in general such a construction is intended in the sense of one having skill in the art would understand the convention (e.g., "a system having at least one of A, B, or C" would include but not be limited to systems that have A alone, B alone, C alone, A and B together, A and C together, B and C together, and/or A, B, and C together).

The invention claimed is:

1. A method comprising:
   creating one or more administered content indexes for a set of motes;
   obtaining at least a part of the one or more administered content indexes of the set of motes, the obtaining comprising:
      obtaining first sensing, control, and routing/spatial indexes for a first subset of the set of motes associated with a first domain, and
      obtaining second sensing, control, and routing/spatial indexes for a second subset of the set of motes associated with a second domain, the second domain being different from the first domain; and
   creating a federated index from at least the part of the one or more administered content indexes, the federated index comprising federated sensing, control, and routing/spatial indexes for the first subset of the set of motes associated with the first domain and the second subset of the set of motes associated with the second domain,
   wherein said creating further comprises:
      determining a mote-network address of a first mote;
      determining a listing of mote-network addresses of other motes directly accessible from the first mote by direct radio transmission;
      determining a listing of spatial orientations of the other motes relative to the first mote and spatial reference locations for the other motes that are directly accessible from the first mote; and
      associating, with the mote-network address of the first mote, the listing of mote-network addresses of the other motes directly accessible from the first mote and the listing of the spatial orientations of the other motes relative to the first mote and the spatial reference locations for the other motes that are directly accessible from the first mote.

2. The method of claim 1, wherein said creating the one or more administered content indexes for the set of motes further comprises:
   aggregating at least a part of one or more mote-addressed content indexes from the set of motes.

3. The method of claim 2, wherein said aggregating at least a part of one or more mote-addressed content indexes from the set of motes further comprises:
   receiving at least a part of one or more mote-addressed indexes of the set of motes.

4. The method of claim 2, wherein said aggregating at least a part of one or more mote-addressed content indexes from the set of motes further comprises:
   creating one or more multi-mote content indexes of the set of motes.

5. The method of claim 4, wherein said creating one or more multi-mote content indexes of the set of motes further comprises:
   obtaining a listing of motes appropriate to at least one of the one or more multi-mote content indexes.

6. The method of claim 4, wherein said creating one or more multi-mote content indexes of the set of motes further comprises:
   obtaining a listing of motes appropriate to at least one of the one or more multi-mote content indexes from a multi-mote registry.

7. The method of claim 4, wherein said creating one or more multi-mote content indexes of the set of motes further comprises:
   obtaining a pre-loaded listing of motes appropriate to at least one of the one or more multimote content indexes.

8. The method of claim 4, wherein said creating one or more multi-mote content indexes of the set of motes further comprises:

obtaining a listing of motes appropriate to at least one of the one or more multi-mote content indexes from one or motes to be included in the listing.

9. The method of claim 4, wherein said creating one or more multi-mote content indexes of the set of motes further comprises:
receiving at least a part of at least one of a mote-addressed sensing index or a mote-addressed control index from a reporting entity at a mote of the set of motes.

10. The method of claim 4, wherein said creating one or more multi-mote content indexes of the set of motes further comprises:
receiving at least a part of at least one of a mote-addressed routing/spatial index from a reporting entity at a mote of the set of motes.

11. The method of claim 1, wherein said creating further comprises:
inserting at least one device identifier of a first mote in the one or more administered content indexes and indicating at least one of: an associated format of information of the first mote, a format of commands of the first mote, or availability of information of the first mote.

12. The method of claim 11, wherein indicating at least one of an associated format of information of the first mote, a format of commands of the first mote, or availability of information of the first mote comprises indicating an associated format of information of the first mote, a format of commands of the first mote, and availability of information of the first mote.

13. The method of claim 1, wherein said creating further comprises:
determining a mote-network address of a first mote;
determining one or more types of control available from at least one device of the first mote; and
associating the one or more types of control available from the at least one device of the first mote with the mote-network address of the first mote.

14. The method of claim 1, wherein said creating further comprises:
determining a mote-network address of a first mote;
determining one or more types of sensing available from at least one device of the first mote; and
associating the one or more types of sensing available from the at least one device of the first mote with the mote-network address of the first mote.

15. The method of claim 1, wherein said creating further comprises:
determining one or more types of spatial information related to at least one device of or proximate to the first mote; and
associating the one or more types of spatial information related to the at least one device of or proximate to the first mote with the mote-network address of the first mote.

16. The method of claim 1, wherein said creating further comprises:
associating one or more mote-appropriate routing addresses with the one or more administered content indexes.

17. The method of claim 1, wherein said creating further comprises:
associating one or more mote-appropriate routing addresses with at least one directly mote-addressed content index.

18. The method of claim 1, wherein said creating further comprises:
associating one or more mote-appropriate routing addresses with at least one indirectly mote-addressed content index.

19. The method of claim 1, wherein said creating further comprises creating at least one extensible index.

* * * * *